United States Patent
Song et al.

(10) Patent No.: US 12,530,738 B2
(45) Date of Patent: Jan. 20, 2026

(54) NEURAL NETWORK TRAINING METHOD, IMAGE PROCESSING METHOD, AND APPARATUS

(71) Applicant: HUAWEI TECHNOLOGIES CO., LTD., Guangdong (CN)

(72) Inventors: Dehua Song, Moscow (RU); Yunhe Wang, Beijing (CN); Hanting Chen, Shenzhen (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 18/147,371

(22) Filed: Dec. 28, 2022

(65) Prior Publication Data
US 2023/0177641 A1 Jun. 8, 2023

Related U.S. Application Data

(63) Continuation of application No. PCT/CN2021/092581, filed on May 10, 2021.

(30) Foreign Application Priority Data

Jun. 30, 2020 (CN) .......................... 202010616988.X

(51) Int. Cl.
*G06T 3/4046* (2024.01)
*G06T 3/4015* (2024.01)
(Continued)

(52) U.S. Cl.
CPC .......... *G06T 3/4046* (2013.01); *G06T 3/4015* (2013.01); *G06T 3/4053* (2013.01);
(Continued)

(58) Field of Classification Search
CPC ... G06T 3/4046; G06T 3/4015; G06T 3/4053; G06T 5/20; G06T 5/73;
(Continued)

(56) References Cited

U.S. PATENT DOCUMENTS

| | | | |
|---|---|---|---|
| 2021/0019627 A1* | 1/2021 | Zhang | G06T 7/246 |
| 2022/0004849 A1* | 1/2022 | Chen | G06T 5/70 |
| 2023/0214458 A1* | 7/2023 | Marsden | G06V 40/28 |
| | | | 382/157 |

FOREIGN PATENT DOCUMENTS

| | | |
|---|---|---|
| CN | 109035260 A | 12/2018 |
| CN | 109191476 A | 1/2019 |

(Continued)

OTHER PUBLICATIONS

Lin et al., "Dense-Add Net: An Novel Convolutional Neural Network for Remote Sensing Image Inpainting", 2018, IEEE Xplore, IGARSS 2018, pp. 4985-4988 (Year: 2018).*

(Continued)

*Primary Examiner* — Chan S Park
*Assistant Examiner* — Daniel C Chang

(57) ABSTRACT

A neural network training method, includes: obtaining an input feature map of a training image; performing feature extraction processing on the input feature map by using a feature extraction core of a neural network to obtain a first candidate feature map; adding the first candidate feature map and a second candidate feature map to obtain an output feature map, where the second candidate feature map is a feature map obtained after a value corresponding to each element in the input feature map is increased by N times, and N is greater than 0; determining an image processing result of the training image based on the output feature map; and adjusting a parameter of the neural network based on the image processing result.

14 Claims, 9 Drawing Sheets

(51) Int. Cl.
- *G06T 3/4053* (2024.01)
- *G06T 5/20* (2006.01)
- *G06T 5/73* (2024.01)

(52) U.S. Cl.
CPC ............... *G06T 5/20* (2013.01); *G06T 5/73* (2024.01); *G06T 2207/20081* (2013.01); *G06T 2207/20084* (2013.01)

(58) Field of Classification Search
CPC . G06T 2207/20081; G06T 2207/20084; G06T 5/70; G06N 3/044; G06N 3/045; G06N 3/048; G06N 3/084; G06N 3/09; G06N 3/0464; G06N 3/08
See application file for complete search history.

(56) References Cited

FOREIGN PATENT DOCUMENTS

| CN | 110096960 | A | 8/2019 |
|---|---|---|---|
| CN | 110111366 | A | 8/2019 |
| CN | 110543890 | A | 12/2019 |
| CN | 111145107 | A | 5/2020 |
| CN | 111311629 | A | 6/2020 |
| CN | 111914997 | A | 11/2020 |
| CN | 111914997 | B | 4/2024 |
| KR | 20120100171 | A | 9/2012 |
| WO | 2018214195 | A1 | 11/2018 |
| WO | 2019020075 | A1 | 1/2019 |
| WO | 2019184462 | A1 | 10/2019 |

OTHER PUBLICATIONS

Hanting Chen et al: "AdderNet: Do We Really Need Multiplications in Deep Learning?", arxiv.org, Cornell University Library, 201 Olin Library Cornell University Ithaca, NY 14853, Dec. 31, 2019 (Dec. 31, 2019), p. 1-p. 5, XP081570359.

Lin Daoyu et al: "Dense-Add Net: An Novel Convolutional Neural Network for Remote Sensing Image Inpainting", IGARSS 2018-2018 IEEE International Geoscience and Remote Sensing Symposium, IEEE, Jul. 22, 2018 (Jul. 22, 2018), pp. 4985-4988, XP033438298.

Dehua Song et al: "AdderSR: Towards Energy Efficient Image Super-Resolution", arxiv.org, Sep. 21, 2020 (Sep. 21, 2020), total 9pages, XP081766129.

Office Action dated Jul. 8, 2023, issued for Chinese Application No. 202010616988.X (8 pages).

Extended European Search Report dated Oct. 16, 2023, issued for European Application No. 21832925.8 (15 pages).

International Search Report and Written Opinion of the International Searching Authority for International Application No. PCT/CN2021/092581 dated Aug. 11, 2021 (10 pages).

* cited by examiner

Feature extraction operation:
$|-1-1|+|0-0|+|1-2|+$
$|-1-5|+|0-4|+|1-2|+$
$|-1-3|+|0-4|+|1-5|$
$=26$ Size of an input feature map:
5 x 5 x 3
Padded height and width: 1

Feature extraction core w0
Size: 3 x 3 x 3

| 1 | 1 | 1 |
|---|---|---|
| −1 | −1 | 0 |
| −1 | 1 | 0 | w0-1

× = 9

Input feature map 1

| −1 | −1 | 1 |
|---|---|---|
| −1 | 1 | 0 |
| −1 | 1 | 0 | w0-2

× = 10

Input feature map 2

Output feature map
Size: 3 x 3 x 1

| 29 | | |
|---|---|---|
| | | |
| | | |

Output feature map 1

| −1 | 1 | −1 |
|---|---|---|
| 0 | 0 | 0 |
| −1 | −1 | −1 | w0-3

× = 10

Input feature map 3

FIG. 7

NEURAL NETWORK TRAINING METHOD, IMAGE PROCESSING METHOD, AND APPARATUS

CROSS-REFERENCE TO RELATED APPLICATIONS

This application is a continuation of International Application No. PCT/CN2021/092581, filed on May 10, 2021, which claims priority to Chinese Patent Application No. 202010616988.X, filed on Jun. 30, 2020. The disclosures of the aforementioned applications are hereby incorporated by reference in their entireties.

TECHNICAL FIELD

This disclosure relates to the field of artificial intelligence, and more specifically, to a neural network training method, an image processing method, and an apparatus.

BACKGROUND

Computer vision is an integral part of various intelligent/autonomous systems in various application fields such as manufacturing, inspection, document analysis, medical diagnosis, and military affairs. Computer vision is knowledge about how to use a camera/video camera and a computer to obtain required data and information of a photographed subject. To be vivid, eyes (the camera/video camera) and a brain (an algorithm) are installed on the computer to replace human eyes to recognize, track, and measure an object, and the like, so that the computer can perceive an environment. Perceiving may be considered as extracting information from a perceptual signal. Therefore, computer vision may also be considered as a science of studying how to make an artificial system "perceive" an image or multi-dimensional data. Generally, computer vision is to replace a visual organ with various imaging systems to obtain input information, and then replace a brain with a computer to process and interpret the input information. A final study objective of computer vision is to enable a computer to observe and understand the world through vision in a way that human beings do, and have a capability of automatically adapting to an environment.

Image restoration (IR) is a major issue in a bottom-layer visual task. With rapid development of artificial intelligence technologies, effect of the image restoration is greatly improved, and the image restoration is increasingly widely applied in the field of computer vision. However, as effect of the image restoration is improved, a calculation amount of a neural network model for performing image restoration is increasing.

Therefore, how to reduce operation overheads of the image restoration becomes an urgent problem to be resolved.

SUMMARY

This disclosure provides a neural network training method, an image processing method, and an apparatus, to reduce operation overheads of image restoration.

According to a first aspect, a neural network training method is provided, where the method includes:
obtaining an input feature map of a training image; performing feature extraction processing on the input feature map by using a feature extraction core of a neural network to obtain a first candidate feature map, where the feature extraction processing enables each element in the first candidate feature map to be an L1 regular distance between the feature extraction core and data at a corresponding location in the input feature map; adding the first candidate feature map and a second candidate feature map to obtain an output feature map, where the second candidate feature map is a feature map obtained after a value corresponding to each element in the input feature map is increased by N times, and N is greater than 0; determining an image processing result of the training image based on the output feature map; and adjusting a parameter of the neural network based on the image processing result.

The foregoing feature extraction processing may be understood as addition filtering processing (or may also be referred to as feature extraction processing) in an adder neural network (AdderNet). A calculation amount of a neural network model is reduced due to features of the addition filtering processing (the addition filtering processing mainly includes an addition operation or a subtraction operation, and an absolute value obtaining operation). However, feature information of the input feature map may be lost in a process of the feature extraction processing (that is, the addition filtering processing) due to the features of the addition filtering processing.

In this embodiment of this disclosure, the second candidate feature map is the feature map obtained after each element in the input feature map is increased by the N times, and the output feature map is obtained by adding the first candidate feature map and the second candidate feature map, where the output feature map includes the feature information of the input feature map. Therefore, a loss in the feature information of the input feature map in a process of performing feature extraction by using the adder neural network can be avoided. In this way, energy consumption of the neural network model can be effectively reduced without affecting image processing effect.

Optionally, the L1 regular distance may also be referred to as an L1 distance, an L1 norm distance, a Manhattan distance, or a taxi distance.

The second candidate feature map may be considered as the feature map obtained after the value corresponding to each element in the input feature map is increased by the N times.

For example, if the input feature map is a 3×3 feature map, that is, the input feature map includes nine elements, the second candidate feature map may be a feature map obtained after values corresponding to the nine elements in the input feature map are all increased by the N times.

Optionally, the image processing may include at least one of image super-resolution processing, image denoising processing, image demosaicing processing, and image deblurring processing.

With reference to the first aspect, in some implementations of the first aspect, the adding the first candidate feature map and a second candidate feature map to obtain an output feature map includes:
processing the first candidate feature map by using an activation function to obtain the processed first candidate feature map; and adding the processed first candidate feature map and the second candidate feature map to obtain the output feature map.

In this embodiment of this disclosure, the first candidate feature map is processed by using the activation function, and this can further improve image processing effect.

With reference to the first aspect, in some implementations of the first aspect, the processing the first candidate feature map by using an activation function includes:

enhancing high-frequency texture information of the first candidate feature map by using a power activation function, where the parameter of the neural network includes a parameter of the power activation function.

In this embodiment of this disclosure, the high-frequency texture information of the first candidate feature map is enhanced by using the power activation function, and this can improve image processing effect.

In addition, the parameter of the neural network includes the parameter of the power activation function, that is, the parameter of the power activation function is learnable. A problem that the adder neural network cannot effectively enhance the high-frequency texture information can be resolved by using the learnable power activation function.

Further, the learnable power activation function is trained to help the neural network adapt to various different tasks and scenarios.

With reference to the first aspect, in some implementations of the first aspect, the determining an image processing result of the training image based on the output feature map includes:
processing the output feature map by using an activation function to obtain the processed output feature map; and determining the image processing result of the training image by using the processed output feature map.

In this embodiment of this disclosure, the output feature map is processed by using the activation function, and this can further improve image processing effect.

With reference to the first aspect, in some implementations of the first aspect, the processing the output feature map by using an activation function includes:
enhancing high-frequency texture information of the output feature map by using a power activation function, where the parameter of the neural network includes a parameter of the power activation function.

In this embodiment of this disclosure, the high-frequency texture information of the output feature map is enhanced by using the power activation function, and this can improve image processing effect.

In addition, the parameter of the neural network includes the parameter of the power activation function, that is, the parameter of the power activation function is learnable. A problem that the adder neural network cannot effectively enhance the high-frequency texture information can be resolved by using the learnable power activation function.

Further, the learnable power activation function is trained to help the neural network adapt to various different tasks and scenarios.

With reference to the first aspect, in some implementations of the first aspect, the power activation function is $\mathcal{P}(Y) = \text{sign}(Y) \cdot |Y|^\alpha$, where Y is a feature map input into the power activation function, sign(•) is a symbolic function, |•| is an absolute value operation, α is a parameter of the power activation function, and α>0.

According to a second aspect, an image processing method is provided, and the method includes:
obtaining an input feature map of a to-be-processed image; and performing image super-resolution processing on the input feature map by using a preset neural network to obtain an image super-resolution processing result of the to-be-processed image, where the neural network is obtained after training by using the method in any implementation of the first aspect.

In this embodiment of this disclosure, the neural network is obtained after training by using the method in any implementation of the first aspect. Therefore, a loss in feature information of the input feature map in a process of performing feature extraction by using an adder neural network can be avoided. In this way, energy consumption of a neural network model can be effectively reduced without affecting image processing effect.

With reference to the second aspect, in some implementations of the second aspect, image processing includes at least one of image super-resolution processing, image denoising processing, image demosaicing processing, and image deblurring processing.

According to a third aspect, a neural network training apparatus is provided, including:
an obtaining unit, configured to obtain an input feature map of a training image: a feature extraction unit, configured to perform feature extraction processing on the input feature map by using a feature extraction core of a neural network to obtain a first candidate feature map, where the feature extraction processing enables each element in the first candidate feature map to be an L1 regular distance between the feature extraction core and data at a corresponding location in the input feature map; a processing unit, configured to add the first candidate feature map and a second candidate feature map to obtain an output feature map, where the second candidate feature map is a feature map obtained after a value corresponding to each element in the input feature map is increased by N times, and N is greater than 0; an image processing unit, configured to determine an image processing result of the training image based on the output feature map; and an adjustment unit, configured to adjust a parameter of the neural network based on the image processing result.

The foregoing feature extraction processing may be understood as addition filtering processing (or may also be referred to as feature extraction processing) in an adder neural network (AdderNet). A calculation amount of a neural network model is reduced due to features of the addition filtering processing (the addition filtering processing mainly includes an addition operation or a subtraction operation, and an absolute value obtaining operation). However, feature information of the input feature map may be lost in a process of the feature extraction processing (that is, the addition filtering processing) due to the features of the addition filtering processing.

In this embodiment of this disclosure, the second candidate feature map is the feature map obtained after each element in the input feature map is increased by the N times, and the output feature map is obtained by adding the first candidate feature map and the second candidate feature map, where the output feature map includes the feature information of the input feature map. Therefore, a loss in the feature information of the input feature map in a process of performing feature extraction by using the adder neural network can be avoided. In this way, energy consumption of the neural network model can be effectively reduced without affecting image processing effect.

Optionally, the L1 regular distance may also be referred to as an L1 distance, an L1 norm distance, a Manhattan distance, or a taxi distance.

The second candidate feature map may be considered as the feature map obtained after the value corresponding to each element in the input feature map is increased by the N times.

For example, if the input feature map is a 3×3 feature map, that is, the input feature map includes nine elements, the second candidate feature map may be a feature map obtained after values corresponding to the nine elements in the input feature map are all increased by the N times.

Optionally, the image processing may include at least one of image super-resolution processing, image denoising processing, image demosaicing processing, and image deblurring processing.

With reference to the third aspect, in some implementations of the third aspect, the processing unit is specifically configured to:
  process the first candidate feature map by using an activation function to obtain the processed first candidate feature map; and add the processed first candidate feature map and the second candidate feature map to obtain the output feature map.

In this embodiment of this disclosure, the first candidate feature map is processed by using the activation function, and this can further improve image processing effect.

With reference to the third aspect, in some implementations of the third aspect, the processing unit is specifically configured to:
  enhance high-frequency texture information of the first candidate feature map by using a power activation function, where the parameter of the neural network includes a parameter of the power activation function.

In this embodiment of this disclosure, the high-frequency texture information of the first candidate feature map is enhanced by using the power activation function, and this can improve image processing effect.

In addition, the parameter of the neural network includes the parameter of the power activation function, that is, the parameter of the power activation function is learnable. A problem that the adder neural network cannot effectively enhance the high-frequency texture information can be resolved by using the learnable power activation function.

Further, the learnable power activation function is trained to help the neural network adapt to various different tasks and scenarios.

With reference to the third aspect, in some implementations of the third aspect, the image processing unit is specifically configured to:
  process the output feature map by using an activation function to obtain the processed output feature map; and determine the image processing result of the training image by using the processed output feature map.

In this embodiment of this disclosure, the output feature map is processed by using the activation function, and this can further improve image processing effect.

With reference to the third aspect, in some implementations of the third aspect, the image processing unit is specifically configured to:
  enhance high-frequency texture information of the output feature map by using a power activation function, where the parameter of the neural network includes a parameter of the power activation function.

In this embodiment of this disclosure, the high-frequency texture information of the output feature map is enhanced by using the power activation function, and this can improve image processing effect.

In addition, the parameter of the neural network includes the parameter of the power activation function, that is, the parameter of the power activation function is learnable. A problem that the adder neural network cannot effectively enhance the high-frequency texture information can be resolved by using the learnable power activation function.

Further, the learnable power activation function is trained to help the neural network adapt to various different tasks and scenarios.

With reference to the third aspect, in some implementations of the third aspect, the power activation function is $\mathcal{P}_{(Y)} = \text{sign}(Y) \cdot |Y|^\alpha$, where Y is a feature map input into the power activation function, sign(•) is a symbolic function, |•| is an absolute value operation, $\alpha$ is a parameter of the power activation function, and $\alpha > 0$.

According to a fourth aspect, an image processing apparatus is provided, including:
  an obtaining unit, configured to obtain an input feature map of a to-be-processed image; and an image processing unit, configured to perform image processing on the input feature map by using a preset neural network to obtain an image processing result of the to-be-processed image, where the neural network is obtained after training by using the method in any implementation of the first aspect.

In this embodiment of this disclosure, the neural network is obtained after training by using the method in any implementation of the first aspect. Therefore, a loss in feature information of the input feature map in a process of performing feature extraction by using an adder neural network can be avoided. In this way, energy consumption of a neural network model can be effectively reduced without affecting image processing effect.

With reference to the fourth aspect, in some implementations of the fourth aspect, image processing includes at least one of image super-resolution processing, image denoising processing, image demosaicing processing, and image deblurring processing.

According to a fifth aspect, a neural network training apparatus is provided. The apparatus includes: a memory, configured to store a program; and a processor, configured to execute the program stored in the memory. When the program stored in the memory is executed, the processor is configured to perform the method in any implementation of the first aspect.

The processor in the fifth aspect may be a central processing unit (CPU), or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google for machine learning.

According to a sixth aspect, an image processing apparatus is provided. The apparatus includes: a memory, configured to store a program; and a processor, configured to execute the program stored in the memory. When the program stored in the memory is executed, the processor is configured to perform the method in any implementation of the second aspect.

The processor in the sixth aspect may be a central processing unit (CPU), or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google for machine learning.

According to a seventh aspect, a computer-readable medium is provided. The computer-readable medium stores program code to be executed by a device, and the program code includes program code used to perform the method in any one of the implementations of the first aspect or the second aspect.

According to an eighth aspect, a computer program product including instructions is provided. When the computer program product runs on a computer, the computer is enabled to perform the method in any one of the implementations of the first aspect or the second aspect.

According to a ninth aspect, a chip is provided. The chip includes a processor and a data interface. The processor performs the method in any one of the implementations of the first aspect or the second aspect by reading, through the data interface, instructions stored in a memory.

Optionally, in an implementation, the chip may further include the memory, and the memory stores the instructions. The processor is configured to execute the instructions stored in the memory, and when the instructions are executed, the processor is configured to perform the method in any one of the implementations of the first aspect or the second aspect.

The foregoing chip may be specifically a field-programmable gate array (FPGA) or an application-specific integrated circuit (ASIC).

The feature extraction processing in embodiments of this disclosure may be understood as the addition filtering processing (or may also be referred to as the feature extraction processing) in the adder neural network (AdderNet). The calculation amount of the neural network model is reduced due to the features of the addition filtering processing (the addition filtering processing mainly includes the addition operation or the subtraction operation, and the absolute value obtaining operation). However, the feature information of the input feature map may be lost in the process of the feature extraction processing (that is, the addition filtering processing) due to the features of the addition filtering processing.

In embodiments of this disclosure, the second candidate feature map is the feature map obtained after each element in the input feature map is increased by the N times, and the output feature map is obtained by adding the first candidate feature map and the second candidate feature map, where the output feature map includes the feature information of the input feature map. Therefore, the loss in the feature information of the input feature map in the process of performing feature extraction by using the adder neural network can be avoided. In this way, energy consumption of the neural network model can be effectively reduced without affecting image processing effect.

BRIEF DESCRIPTION OF DRAWINGS

FIG. 7 is a schematic diagram of a feature extraction operation according to another embodiment of this disclosure:

DESCRIPTION OF EMBODIMENTS

Figure 1:
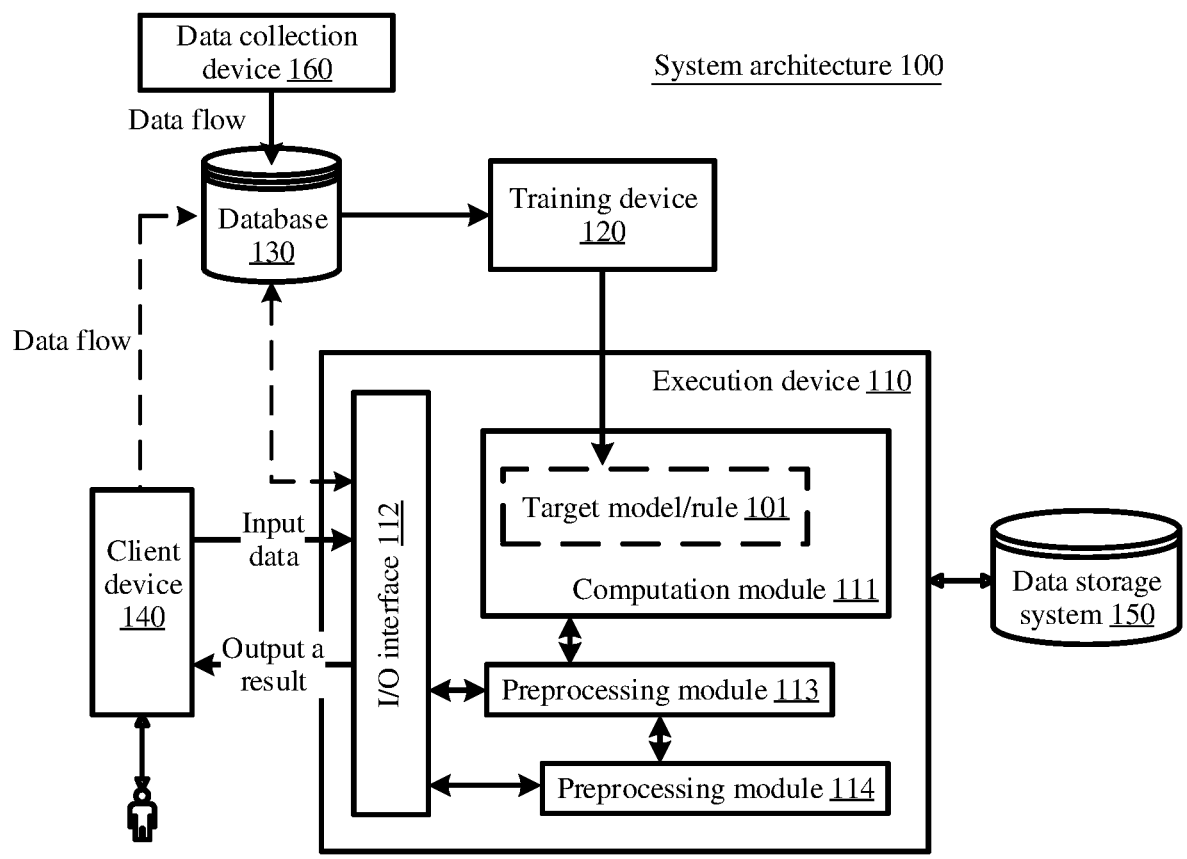
FIG. 1 is a schematic diagram of a structure of a system architecture according to an embodiment of this disclosure.

The following describes technical solutions of this disclosure with reference to accompanying drawings.

Embodiments of this disclosure may be applied to photographing, video recording, safe city, human-computer interaction, and another scenario in which image processing needs to be performed, for example, image classification, image segmentation, image recognition, image restoration, and the like.

It should be understood that an image in embodiments of this disclosure may be a static image (or referred to as a static picture) or a moving image (or referred to as a moving picture). For example, the image in this disclosure may be a video or a moving picture, or the image in this disclosure may be a static picture or photo. For ease of description, the static image or the moving image is collectively referred to as an image in the following embodiments of this disclosure.

The method in embodiments of this disclosure may be specifically applied to photographing and image recognition scenarios. The following describes the two scenarios in detail.

Photographing:

When a user takes a photo by using a terminal such as a mobile phone, raw image data directly obtained by the mobile phone includes noise, and each pixel includes only one color. The user may perform denoising processing and demosaicing processing on the raw image data by using the method in embodiments of this disclosure to obtain a normal color image. In this way, better visual experience is provided for the user.

Alternatively, when the user photographs a long-distance object or a tiny object, resolution of a taken image is low, and details are unclear. The user may directly perform image super-resolution on the mobile phone by using the method in embodiments of this disclosure to convert a low-resolution image into a high-resolution image. In this way, a photographed object is clearer, and user experience is improved.

Image Recognition:

When taking a photo, the user may perform image restoration processing on the taken photo by using an image restoration method in embodiments of this disclosure. In this way, a photo obtained after the image restoration is clearer and has richer colors. In this case, the photo obtained after the image restoration is recognized, and accuracy of image recognition is improved. This improves user experience.

For example, image restoration processing may be first performed on the taken photo by using the image restoration method in embodiments of this disclosure, and then the photo obtained after the image restoration is recognized. In this case, it may be automatically recognized that a photographed object is a flower, an animal, or the like. Further, a category to which the object belongs is also recognized. For example, if the photo taken by the user includes a shared bicycle, it may be recognized that the object belongs to bicycles. Further, related information of the bicycle may be displayed. According to the method in embodiments of this disclosure, image restoration is performed on the taken photo, and the accuracy of the image recognition can be improved. This improves user experience.

It should be understood that the photographing and the image recognition described above are merely two specific scenarios to which the method in embodiments of this disclosure is applied. The method in embodiments of this disclosure is not limited to the foregoing two scenarios. The method in embodiments of this disclosure can be applied to any scenario in which image processing or image restoration needs to be performed, for example, facial recognition. Alternatively, the method in embodiments of this disclosure may be similarly applied to another field, for example, speech recognition and natural language processing. This is not limited embodiments of this disclosure.

It should be noted that the image restoration is a major issue in a bottom-layer visual task, and the image restoration mentioned in embodiments of this disclosure may include the following:

image denoising, image demosaicing, image super-resolution, image deblurring), and another bottom-layer visual task.

Embodiments of this disclosure relate to a large quantity of applications related to a neural network. To better understand the solutions of embodiments of this disclosure, the following first describes related terms and concepts of neural networks that may be mentioned in embodiments of this disclosure.

(1) Neural Network

The neural network may include a neuron. The neuron may be an operation unit that uses $x_s$ and an intercept 1 as an input, and an output of the operation unit may be shown in the following formula:

$$h_{w,b}(x) = f(W^T x) = f\left(\sum_{s=1}^{n} W_s x_s + b\right).$$

s=1, 2, ..., or n, n is a natural number greater than 1, $W_s$ is a weight of $x_s$, and b is a bias of the neuron. f is an activation function of the neuron, used to introduce a non-linear feature into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood to be a neural network with a plurality of hidden layers. The DNN is divided based on locations of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems complex, it is not complex in terms of work at each layer. Simply speaking, the DNN is the following linear relationship expression: $\vec{y} = \alpha(W\vec{x} + \vec{b})$, where $\vec{x}$ is an input vector, $\vec{y}$, is an output vector, $\vec{b}$ is an offset vector, W is a weight matrix (also referred to as a coefficient), and $\alpha(\ )$ is an activation function. At each layer, only such a simple operation is performed on the input vector $\vec{x}$ to obtain the output vector $\vec{y}$. Because there are a plurality of layers in the DNN, there are also a plurality of coefficients W and a plurality of offset vectors $\vec{b}$. Definitions of the parameters in the DNN are as follows: The coefficient W is used as an example. It is assumed that in a DNN with three layers, a linear coefficient from the fourth neuron at the second layer to the second neuron at the third layer is defined as $w_{24}^3$. The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $$W_{jk}^L.$$

It should be noted that the input layer does not have the parameter W. In the deep neural network, more hidden layers make the network more capable of describing a complex case in the real world. Theoretically, a model with more parameters has higher complexity and a larger "capacity". It indicates that the model can complete a more complex learning task. A process of training the deep neural network is a process of learning a weight matrix, and a final objective of training is to obtain weight matrices (weight matrices including vectors W at a plurality of layers) of all layers in a trained deep neural network.

(3) Convolutional Neural Network

The convolutional neural network (CNN) is a deep neural network with a convolutional structure. The convolutional neural network includes a feature extractor including a convolutional layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature planes, and each feature plane may include some neurons arranged in a rectangle. Neurons of a same feature plane share a weight, and the shared weight herein is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, a direct benefit brought by weight sharing is that connections between layers in the convolutional neural network are reduced and an overfitting risk is lowered.

(4) A recurrent neural network (RNN) is used for processing sequence data. A conventional neural network model starts from an input layer to a hidden layer and then to an output layer, and the layers are fully connected, while nodes in each layer are unconnected. This common neural network resolves a plurality of problems, but is still incompetent to resolve a plurality of other problems. For example, to predict a next word in a sentence, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN.

Why is the recurrent neural network still required when the convolutional neural network is available? A reason is simple. In the convolutional neural network, there is a premise that elements are independent of each other, and an input and an output are also independent, such as a cat and a dog. However, many elements are interconnected in the real world. For example, stocks change over time. For another example, a person says: I like traveling, my favorite place is Yunnan, and I will go there in the future if there is a chance. Herein, people should know that the person will go to "Yunnan". People perform inference from the context. However, how does a machine do that? Then, the RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers in the deep neural network). For example, if the predicted value of the network is high, the weight vector is adjusted to decrease the predicted value, and adjustment is continuously performed until the deep neural network can predict the target value that is actually expected or a value that is very close to the target value that is actually expected. Therefore, "how to obtain, through comparison, a difference between the predicted value and the target value" needs to be predefined. This is the loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

In a training process, a neural network may correct values of parameters of an initial neural network model by using an error back propagation (BP) algorithm, so that a reconstruction error loss in the neural network model becomes increasingly smaller. Specifically, an input signal is forward transmitted until an error loss is generated in an output, and the parameter of the initial neural network model is updated through back propagation of information about the error loss, to converge the error loss. The back propagation algorithm is an error-loss-centered back propagation motion intended to obtain a parameter, such as a weight matrix, of an optimal neural network model.

(7) Pixel Value

A pixel value of an image may be a red green blue (RGB) color value, and the pixel value may be a long integer representing a color. For example, the pixel value is 256× Red+100×Green+76Blue, where x represents a multiplication operation, Blue represents a blue component, Green represents a green component, and Red represents a red component. In each color component, a smaller value indicates lower brightness, and a larger value indicates higher brightness. For a grayscale image, a pixel value may be a grayscale value.

As shown in FIG. 1, an embodiment of this disclosure provides a system architecture 100. In FIG. 1, a data collection device 160 is configured to collect training data. For a neural network training method in this embodiment of this disclosure, training data may include a training image and a ground truth (GT) corresponding to the training image. The ground truth corresponding to the training image may be an image processing result with good processing effect obtained after manual preprocessing. For example, the ground truth corresponding to the training image may be an image restoration result that is obtained after the manual preprocessing and that has good image restoration effect.

After collecting the training data, the data collection device 160 stores the training data in a database 130. A training device 120 obtains a target model/rule 101 through training based on the training data maintained in the database 130.

The following describes how the training device 120 obtains the target model/rule 101 based on the training data. The training device 120 processes the input training image to obtain a processing result of the training image, and compares the processing result of the training image with the ground truth corresponding to the training image, until a difference between the processing result that is output by the training device 120 and that is of the training image and the ground truth corresponding to the training image is less than a specific threshold, to complete training of the target model/rule 101 (that is, the neural network).

The target model/rule 101 can be used to implement the neural network obtained after training. To be specific, a processing result of a to-be-processed image can be predicted by inputting the to-be-processed image into the target model/rule 101 after related preprocessing.

It should be noted that, in an actual application, the training data maintained in the database 130 is not necessarily all collected by the data collection device 160, and may be received by another device. It should further be noted that the training device 120 may not necessarily perform training for the target model/rule 101 completely based on the training data maintained in the database 130, or may obtain training data from a cloud or another place for model training. The foregoing description should not be construed as a limitation on embodiments of this disclosure.

The target model/rule 101 obtained after training by the training device 120 may be applied to different systems or devices, for example, applied to an execution device 110 shown in FIG. 1. The execution device 110 may be a terminal, for example, a mobile phone terminal, a tablet computer, a notebook computer, augmented reality (AR)/ virtual reality (VR), or a vehicle-mounted terminal; or may be a server, a cloud device, or the like. In FIG. 1, the execution device 110 is provided with an input/output (I/O) interface 112, configured to exchange data with an external device. A user may input data to the I/O interface 112 by using a client device 140. The input data in this embodiment of this disclosure may include a network structure input by using the client device.

A preprocessing module 113 and a preprocessing module 114 are configured to perform preprocessing based on the input data (for example, the to-be-processed image) received by the I/O interface 112. In this embodiment of this disclosure, the preprocessing module 113 and the preprocessing module 114 may not exist (or only one of the preprocessing module 113 and the preprocessing module 114 exists), and a computation module 111 is directly configured to process the input data.

In a process in which the execution device 110 preprocesses the input data, or in a process in which the computation module 111 in the execution device 110 performs related processing such as computation, the execution device 110 may invoke data, code, and the like in a data storage system 150 for corresponding processing, and may further store, into the data storage system 150, data, instructions, and the like that are obtained through corresponding processing.

Finally, the I/O interface 112 returns a processing result such as the foregoing obtained processing result of the to-be-processed image to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

For example, the target model/rule 101 in this embodiment of this disclosure may also be specifically an image processing apparatus (for example, an image super-resolution apparatus, an image denoising apparatus, an image demosaicing apparatus, and an image deblurring apparatus) in this embodiment of this disclosure. For the image processing apparatus, the training data may include the training image and the ground truth corresponding to the training image.

In the case shown in FIG. 1, the user may manually specify input data, and the input data may be manually specified through an interface provided by the I/O interface 112. In another case, the client device 140 may automatically send the input data to the I/O interface 112. If it is required that the client device 140 needs to obtain authorization from the user to automatically send the input data, the user may set corresponding permission on the client device 140. The user may check, on the client device 140, a result output by the execution device 110. Specifically, the result may be presented in a form of display, sound, an action, or the like. The client device 140 may also serve as a data collector to collect, as new sample data, the input data that is input to the I/O interface 112 and an output result that is output from the I/O interface 112 shown in the figure, and store the new sample data in the database 130. Certainly, the client device 140 may alternatively not perform collection. Instead, the I/O interface 112 directly stores, in the database 130 as the new sample data, the input data that is input to the I/O interface 112 and the output result that is output from the I/O interface 112 in the figure.

It should be noted that FIG. 1 is merely a schematic diagram of a system architecture according to an embodiment of this disclosure. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As shown in FIG. 1, the target model/rule 101 is obtained after training by the training device 120. In this embodiment of this disclosure, the target model/rule 101 may be the neural network obtained after training by using the neural network training method in this disclosure. Alternatively, in this embodiment of this disclosure, the target model/rule 101 may be the image processing apparatus (for example, the image super-resolution apparatus, the image denoising apparatus, the image demosaicing apparatus, or the image deblurring apparatus) in this embodiment of this disclosure.

Specifically, the neural network obtained after training by using the neural network training method in this disclosure may be used for image processing, speech processing, natural language processing, and the like. For example, the neural network may be an adder neural network (AdderNet), a convolutional neural network (CNN), a deep convolutional neural network (DCNN), a recurrent neural network (RNNS), and/or the like.

The adder neural network may be a previously proposed adder neural network and the like. The adder neural network may construct a neural network by using a cheap addition operation to reduce computational power consumption (CVPR 2020) of the network. For details, refer to the conventional technology. Details are not described herein again.

Figure 2:
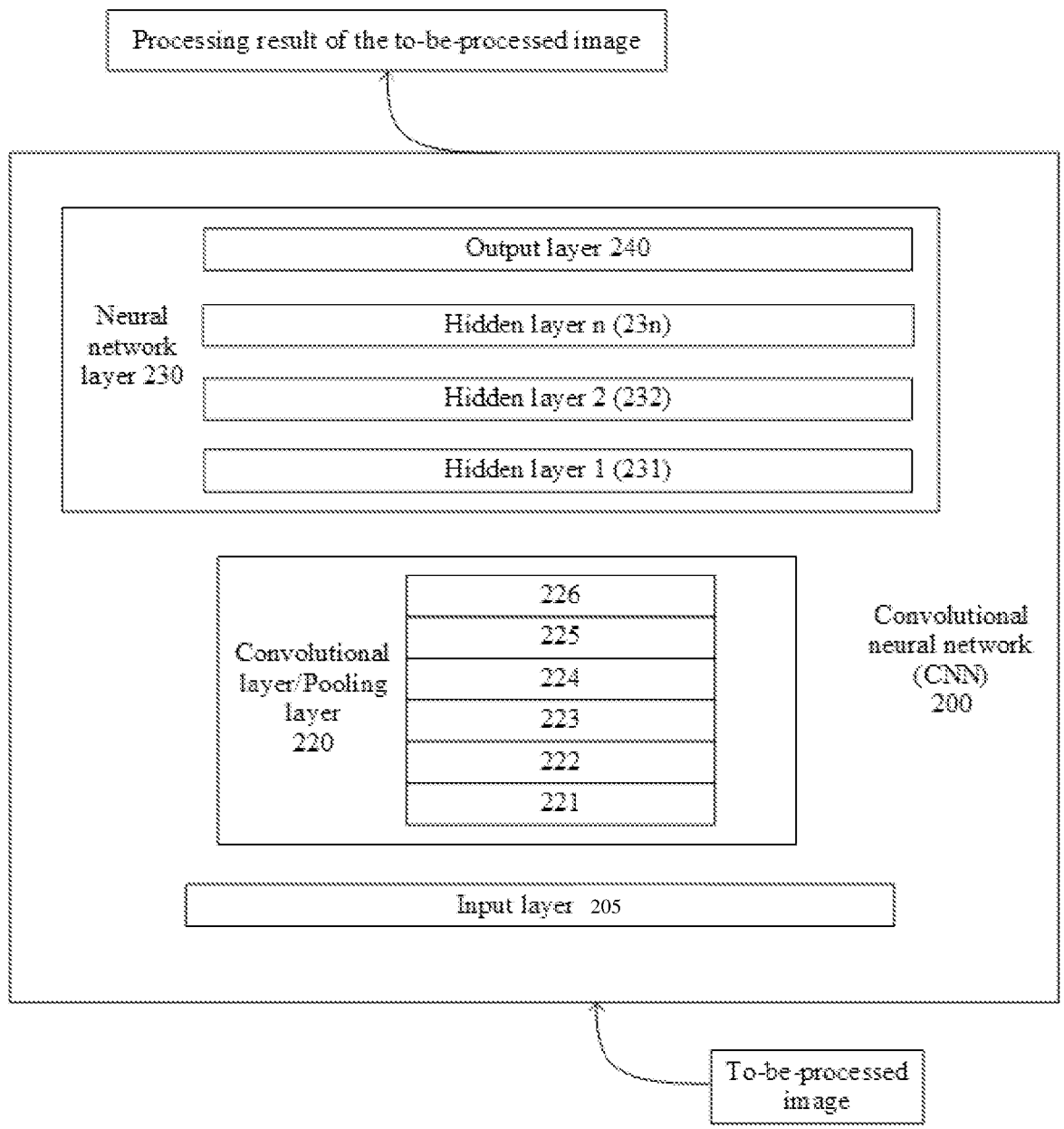
FIG. 2 is a schematic diagram of a structure of a neural network according to an embodiment of this disclosure.

Because the CNN is a very common neural network, the following describes a structure of the neural network in detail with reference to FIG. 2 by using the image processing as an example.

As described in the foregoing description of basic concepts, the convolutional neural network is a deep neural network with a convolutional structure, and is a deep learning architecture. The deep learning architecture is to perform multi-level learning at different abstract levels by using a machine learning algorithm. As the deep learning architecture, the CNN is a feed-forward artificial neural network. Each neuron in the feed-forward artificial neural network may respond to data (for example, an image) input into the neural network.

As shown in FIG. 2, the convolutional neural network (CNN) 200 may include an input layer 205, a convolutional layer/pooling layer 220 (where the pooling layer is optional), and a neural network layer 230. The following describes related content of these layers in detail.

Convolutional Layer/Pooling Layer 220:

Convolutional Layer:

As shown in FIG. 2, for example, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layer 221 and the layer 222 are convolutional layers, the layer 223 is a pooling layer, the layer 224 and the layer 225 are convolutional layers, and the layer 226 is a pooling layer. In other words, an output of a convolutional layer may be used as an input of a following pooling layer, or may be used as an input of another convolutional layer, to continue to perform a convolution operation.

The following describes internal working principles of a convolutional layer by using the convolutional layer 221 as an example.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (two pixels or the like, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, convolution with a single weight matrix generates a convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional image. The dimension herein may be understood as being determined based on the foregoing "a plurality of". Different weight matrices may be used to extract different features from the image. For example, one weight matrix is used to extract edge information of the image, another weight matrix is used to extract a specific color of the image, and still another weight matrix is used to blur unneeded noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a large amount of training in an actual application. The weight matrices formed by using the weight values obtained after training may be used for extracting information from an input image, to enable the convolutional neural network 200 to perform correct prediction.

When the convolutional neural network 200 has a plurality of convolutional layers, an initial convolutional layer (for example, the layer 221) usually extracts more general features, where the general features may also be referred to as low-level features. As a depth of the convolutional neural network 200 increases, a deeper convolutional layer (for example, the layer 226) extracts more complex features, such as high-level semantic features. A feature with higher semantics is more applicable to a to-be-resolved problem.
Pooling Layer/Pooling Layer 220:

Because a quantity of training parameters usually needs to be reduced, a pooling layer usually needs to be periodically introduced after the convolutional layer. For the layers 221 to 226 of 220 in FIG. 2, there may be one pooling layer following one convolutional layer, or one or more pooling layers following a plurality of convolutional layers. During image processing, the pooling layer is only used to reduce a space size of an image. The pooling layer may include an average pooling operator and/or a maximum pooling operator, to perform sampling on an input image to obtain an image with a small size. The average pooling operator may be used to calculate pixel values in the image in a specific range, to generate an average value. The average value is used a result of average pooling. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding subregion of the image input to the pooling layer.
Neural Network Layer 230:

After processing is performed by the convolutional layer/pooling layer 220, the convolutional neural network 200 still cannot output required output information. As described above, at the convolutional layer/pooling layer 220, only features are extracted, and parameters brought by the input image are reduced. However, to generate final output information (required class information or other related information), the convolutional neural network 200 needs to use the neural network layer 230 to generate an output of one required class or outputs of a quantity of a group of required classes. Therefore, the neural network layer 230 may include a plurality of hidden layers (231, 232, . . . , and 23$n$ shown in FIG. 2) and an output layer 240. Parameters included in the plurality of hidden layers may be obtained through pre-training based on related training data of a specific task type. For example, the task type may include image recognition, image classification, super-resolution image reconstruction, and the like.

A layer after the plurality of hidden layers in the neural network layer 230, namely, a last layer of the entire convolutional neural network 200 is the output layer 240. The output layer 240 has a loss function similar to classification cross entropy, and is specifically used to calculate a predicted error. Once forward propagation (propagation in a direction from 210 to 240 shown in FIG. 2 is the forward propagation) of the entire convolutional neural network 200 is complete, back propagation (propagation in a direction from 240 to 210 shown in FIG. 2 is the back propagation) starts to update a weight value and a bias of each layer mentioned above, to reduce a loss in the convolutional neural network 200, and reduce an error between a result output by the convolutional neural network 200 by using the output layer and an ideal result.

It should be noted that the convolutional neural network 200 shown in FIG. 2 is merely used as an example of a convolutional neural network. In a specific application, the convolutional neural network may alternatively exist in a form of another network model.

For example, the neural network 200 in FIG. 2 may alternatively be an adder neural network, and a structure of the adder neural network is similar to a structure of the neural network 200 in FIG. 2. For the adder neural network, the convolutional layer in FIG. 2 may also be referred to as a feature extraction layer or an addition filtering layer. Correspondingly, processing at feature extraction layers or addition filtering layers in the adder neural network may also be referred to as feature extraction processing or addition filtering processing. For detailed description of the feature extraction processing or the addition filtering processing, refer to the conventional technology. Details are not described herein again.

It should be noted that a main difference between the adder neural network and the neural network 200 is as follows: Each convolutional layer of the neural network 200 extracts feature information from an input image matrix by using a convolution operation, and each layer (that is, the feature extraction layer or the addition filtering layer) in the adder neural network performs an addition operation (or a subtraction operation) and an absolute value obtaining operation to extract feature information from the input image matrix. The addition operation (or the subtraction operation) and the absolute value obtaining operation may also be referred to as the feature extraction processing or the addition filtering processing. This is not limited herein.

For detailed description of the adder neural network, and the feature extraction processing or the addition filtering processing at each layer of the adder neural network, refer to the conventional technology. Details are not described herein again.

In this embodiment of this disclosure, a neural network obtained after training by using the neural network training method in this disclosure may be used for the image processing (for example, image restoration). A network structure of the neural network may be shown as the convolutional neural network 200 in FIG. 2.

Alternatively, an image processing apparatus (for example, an image super-resolution apparatus, an image denoising apparatus, an image demosaicing apparatus, and an image deblurring apparatus) in this embodiment of this disclosure may include the convolutional neural network 200 shown in FIG. 2. The image processing apparatus may be configured to perform image processing (for example, the image restoration) on a to-be-processed image to obtain an image processing result of the to-be-processed image.

Figure 3:
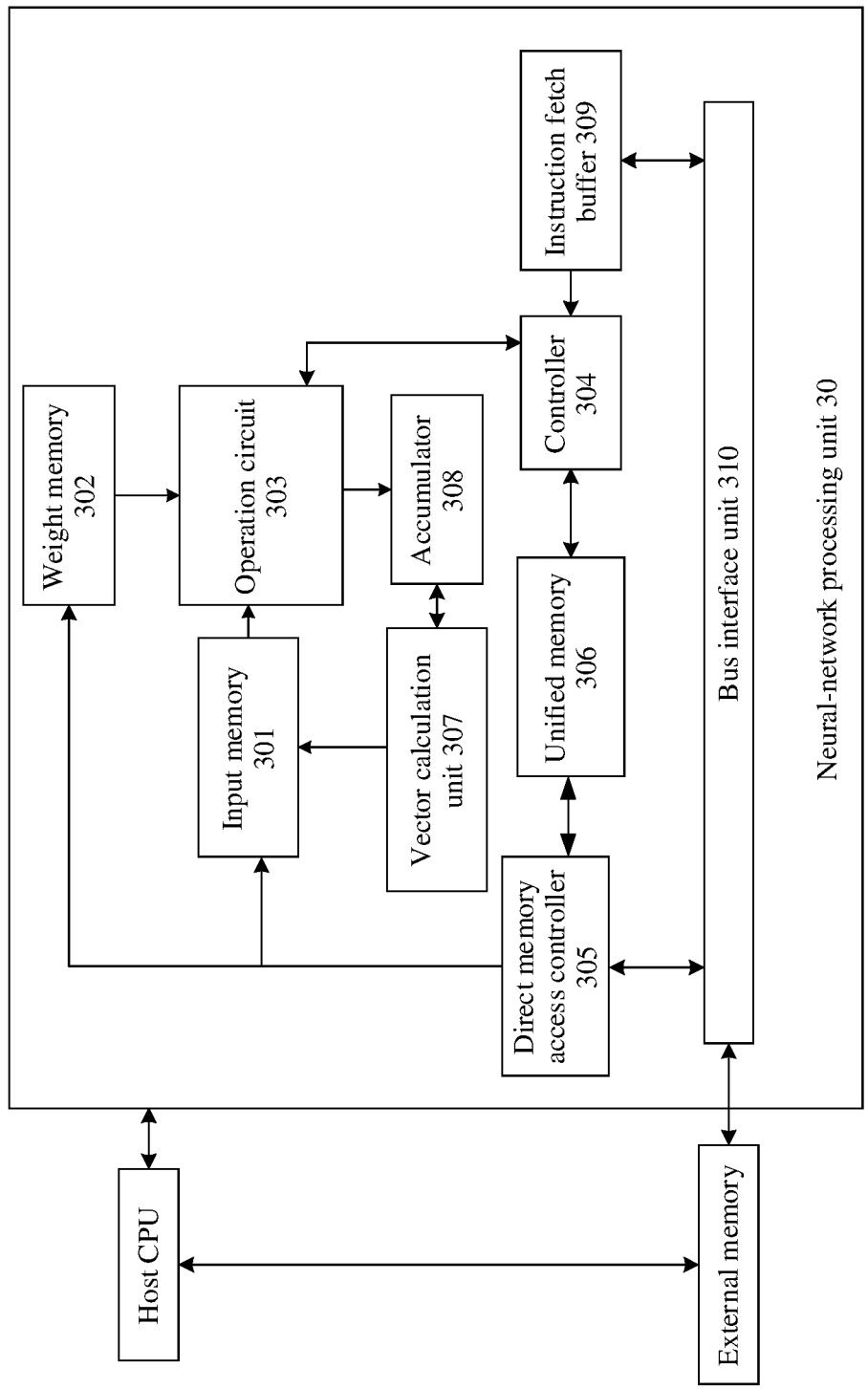
FIG. 3 is a schematic diagram of a hardware structure of a chip according to an embodiment of this disclosure.

FIG. 3 shows a hardware structure of a chip according to an embodiment of this disclosure, and the chip includes a neural-network processing unit 50. The chip may be disposed in the execution device 110 shown in FIG. 1, to complete calculation work of the computation module 111. The chip may alternatively be disposed in the training device 120 shown in FIG. 1, to complete training work of the training device 120 and output the target model/rule 101. All algorithms of the layers in the neural network shown in FIG. 2 may be implemented in the chip shown in FIG. 3.

The neural-network processing unit NPU 50 is mounted to a host CPU as a coprocessor, and the host CPU allocates a task to the NPU 50. A core part of the NPU is an operation circuit 503, and a controller 504 controls the operation circuit 503 to extract data in a memory (a weight memory or an input memory) and perform an operation.

In some implementations, the operation circuit 503 includes a plurality of processing engines (PE). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit 503 fetches data corresponding to the matrix B from the weight memory 502 and buffers the data in each PE of the operation circuit 503. The operation circuit 503 fetches data of the matrix A from an input memory 501, to perform a matrix operation on the matrix B, and stores an obtained partial result or an obtained final result of the matrix into an accumulator 508.

A vector calculation unit 507 may perform further processing such as vector multiplication, vector addition, an exponent operation, a logarithm operation, or value comparison on an output of the operation circuit 503. For example, the vector calculation unit 507 may be configured to perform network calculation, such as pooling, batch normalization, or local response normalization at a non-convolutional/non-FC layer of a neural network.

In some implementations, the vector calculation unit 507 can store a processed output vector in a unified memory 506. For example, the vector calculation unit 507 may apply a non-linear function to an output, for example, a vector of an accumulated value, of the operation circuit 503 to generate an activation value. In some implementations, the vector calculation unit 507 generates a normalized value, a combined value, or both. In some implementations, the processed output vector can be used as activation input of the operation circuit 503, for example, the processed output vector is used in a subsequent layer of the neural network.

The unified memory 506 is configured to store input data and output data.

For weight data, a direct memory access controller (DMAC) 505 directly transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store instructions used by the controller 504.

The controller 504 is configured to invoke the instructions cached in the instruction fetch buffer 509, to control a working process of an operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

Operations of the layers in the convolutional neural network shown in FIG. 2 may be performed by the operation circuit 503 or the vector calculation unit 307.

The training device 120 in FIG. 1 described above can perform steps of the neural network training method in embodiments of this disclosure, the execution device 110 in FIG. 1 can perform steps of an image processing method (for example, an image super-resolution method, an image denoising method, an image demosaicing method, and an image deblurring method) in embodiments of this disclosure, the neural network model shown in FIG. 2 and the chip shown in FIG. 3 may also be configured to perform the steps of the image processing method in embodiments of this disclosure, and the chip shown in FIG. 3 may also be configured to perform the steps of the neural network training method in embodiments of this disclosure.

Figure 4:
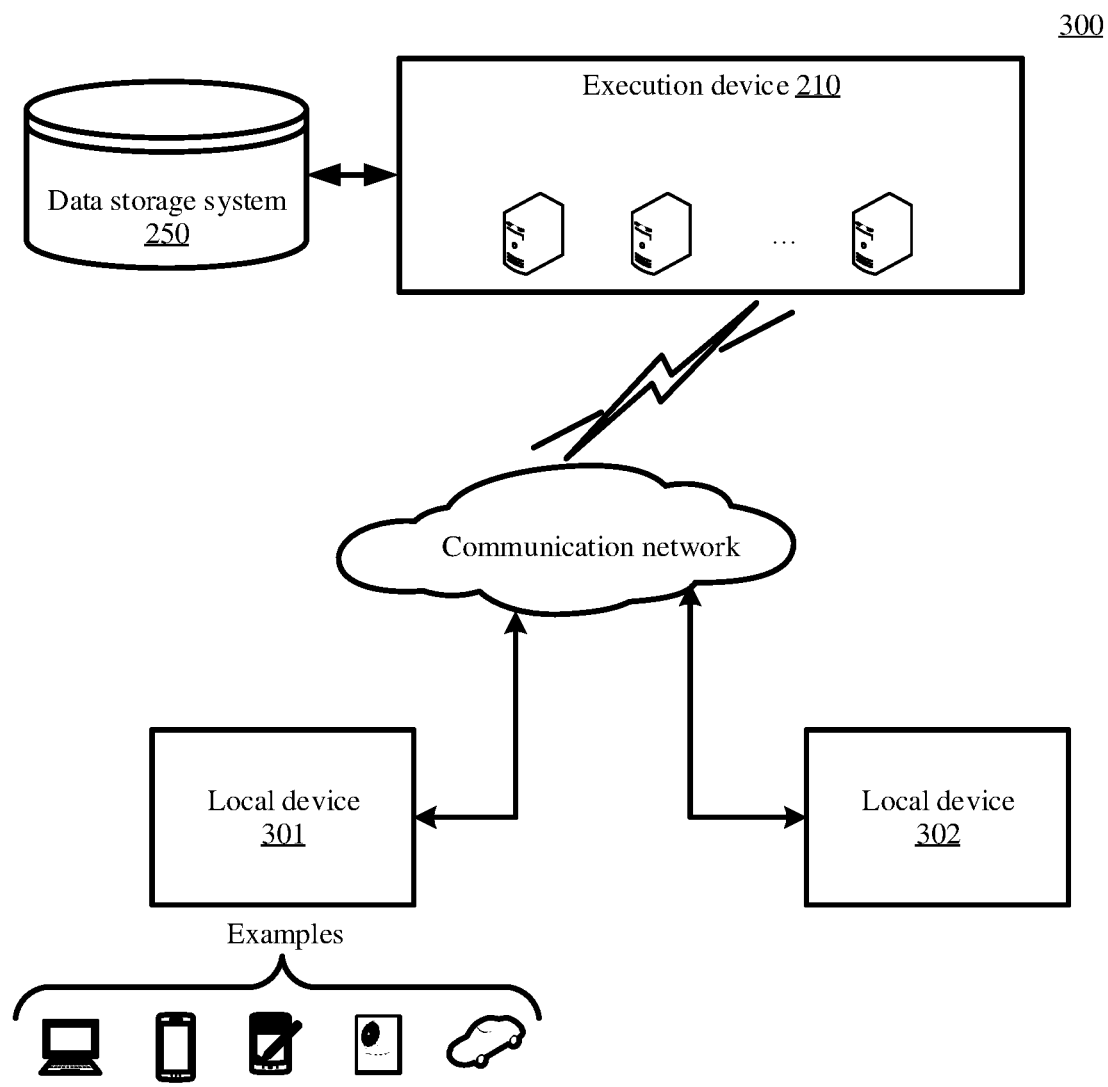
FIG. 4 is a schematic diagram of a structure of another system architecture according to an embodiment of this disclosure.

As shown in FIG. 4, an embodiment of this disclosure provides a system architecture 300. The system architecture includes a local device 301, a local device 302, an execution device 210, and a data storage system 250. The local device 301 and the local device 302 are connected to the execution device 210 by using a communication network.

The execution device 210 may be implemented by one or more servers. Optionally, the execution device 210 may cooperate with another computing device, for example, a device such as a data memory, a router, or a load balancer. The execution device 210 may be disposed on one physical site, or distributed on a plurality of physical sites. The execution device 210 may implement the neural network training method or the image processing method (for example, the image super-resolution method, the image denoising method, the image demosaicing method, and the image deblurring method) in embodiments of this disclosure by using data in the data storage system 250 or by invoking program code in the data storage system 250.

Specifically, the execution device 210 may execute the following process:

obtaining an input feature map of a training image: performing feature extraction processing on the input feature map by using a feature extraction core of a neural network to obtain a first candidate feature map, where the feature extraction processing enables each element in the first candidate feature map to be an L1 regular distance between the feature extraction core and data at a corresponding location in the input feature map: adding the first candidate feature map and a second candidate feature map to obtain an output feature map, where the second candidate feature map is a feature map obtained after the input feature map is increased by N times, and N is greater than 0; determining an image processing result of the training image based on the output feature map; and adjusting a parameter of the neural network based on the image processing result.

A neural network can be obtained through training by the execution device 210 by using the foregoing process. The neural network may be used for image processing, speech processing, natural language processing, and the like. For example, the neural network may be used to implement the image super-resolution method, the image denoising method, the image demosaicing method, and the image deblurring method in embodiments of this disclosure.

Alternatively, an image processing apparatus can be built by the execution device 210 by using the foregoing process. The image processing apparatus may be configured for image processing (for example, may be configured to implement the image super-resolution method, the image denoising method, the image demosaicing method, and the image deblurring method in embodiments of this disclosure).

A user may operate respective user equipment (for example, a local device 301 and a local device 302) to interact with the execution device 210. Each local device may be any computing device, such as a personal computer, a computer workstation, a smartphone, a tablet computer, an intelligent camera, an intelligent vehicle, another type of cellular phone, a media consumption device, a wearable device, a set-top box, or a game console.

The local device of each user may interact with the execution device 210 by using a communication network compliant with any communication mechanism/communication standard. The communication network may be a wide area network, a local area network, a point-to-point connection, or any combination thereof.

In an implementation, the local device 301 and the local device 302 obtain related parameters of the neural network from the execution device 210. The neural network is deployed on the local device 301 and the local device 302, and image processing is performed on a to-be-processed image by using the neural network to obtain a processing result of the to-be-processed image.

In another implementation, the neural network may be directly deployed on the execution device 210. The execution device 210 obtains to-be-processed images from the local device 301 and the local device 302, and performs image processing on the to-be-processed image by using the neural network to obtain a processing result of the to-be-processed image.

In an implementation, the local device 301 and the local device 302 obtain related parameters of the image processing apparatus from the execution device 210. The image processing apparatus is deployed on the local device 301 and the local device 302, and image processing is performed on a to-be-processed image by using the image processing apparatus to obtain a processing result of the to-be-processed image.

In another implementation, the image processing apparatus may be directly deployed on the execution device 210. The execution device 210 obtains to-be-processed images from the local device 301 and the local device 302, and performs image processing on the to-be-processed image by using the image processing apparatus to obtain a processing result of the to-be-processed image.

In other words, the execution device 210 may be a cloud device. In this case, the execution device 210 may be deployed on a cloud. Alternatively, the execution device 210 may be a terminal device. In this case, the execution device 210 may be deployed on a user terminal side. This is not limited in this embodiment of this disclosure.

The following describes in detail the neural network training method and the image processing method (for example, the image processing method may include the image super-resolution method, the image denoising method, the image demosaicing method, and the image deblurring method) in embodiments of this disclosure with reference to the accompanying drawings.

Figure 5:
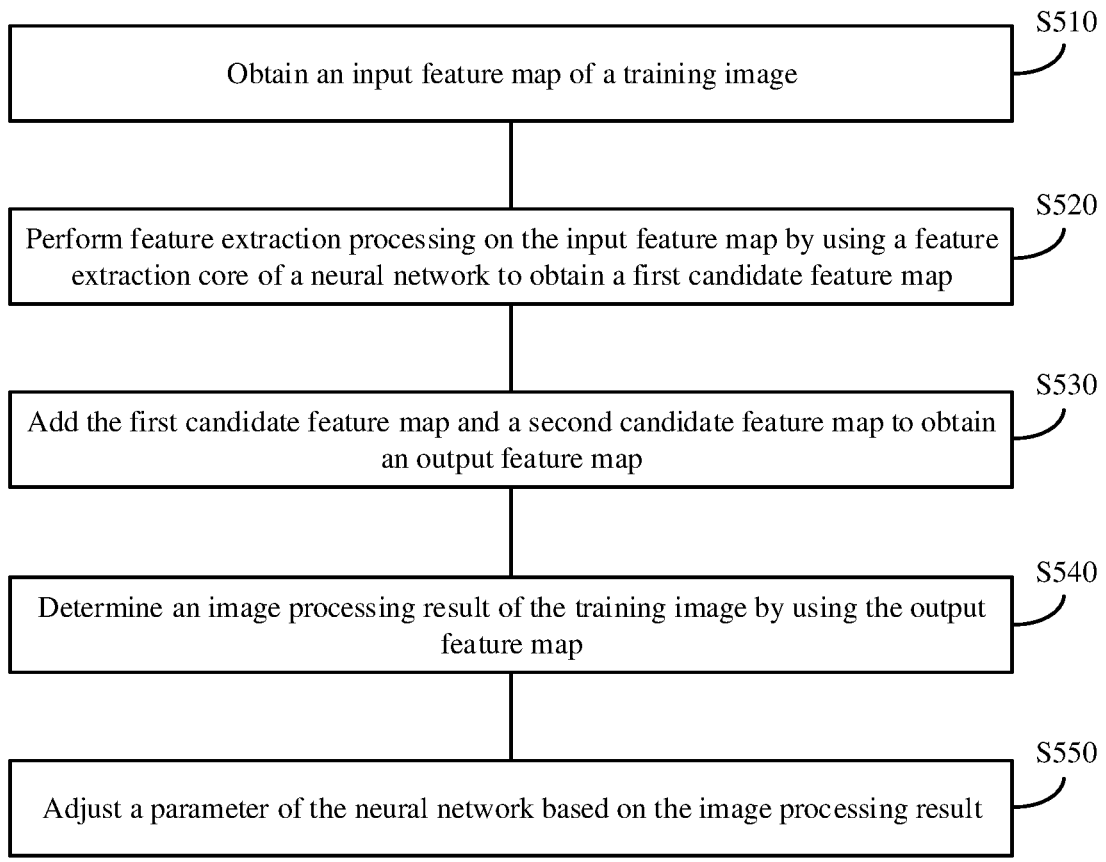
FIG. 5 is a schematic flowchart of a neural network training method according to an embodiment of this disclosure.

FIG. 5 is a schematic flowchart of a neural network training method according to this disclosure. The neural network training method 500 in FIG. 5 may include step 510, step 520, step 530, step 540, and step 550. It should be understood that the neural network obtained through training in the method 500 in FIG. 5 may be an adder neural network (AdderNet).

In some examples, the method 500 may be performed by devices such as the execution device 110 in FIG. 1, the chip shown in FIG. 3, and the execution device 210 in FIG. 4.

S510: Obtain an input feature map of a training image.

The training image may be an image taken by a terminal device by using a camera, or the training image may be an image obtained from inside the terminal device (for example, an image stored in an album of the terminal device, or an image obtained by the terminal device from a cloud). Correspondingly, the input feature map of the training image may be a feature map of the image.

Alternatively, the input feature map of the training image may be a feature map obtained after processing is performed by another layer of the neural network, and the neural network may be the adder neural network.

The adder neural network in this embodiment of this disclosure may include one or more feature extraction layers or addition filtering layers, and may further include another layer such as the input layer, the pooling layer, a fully connected layer, the hidden layer, or the output layer shown in FIG. 2. This is not limited in this embodiment of this disclosure.

It should be understood that the another layer of the neural network described herein may be a layer of the neural network. For example, the another layer may be any one of the input layer, the convolutional layer, the pooling layer, the fully connected layer, the hidden layer, or the output layer of the neural network shown in FIG. 2.

S520: Perform feature extraction processing on the input feature map by using a feature extraction core of the neural network to obtain a first candidate feature map.

The feature extraction processing enables each element in the first candidate feature map to be an L1 regular distance between the feature extraction core and data at a corresponding location in the input feature map.

Optionally, the L1 regular distance may also be referred to as an L1 distance, an L1 norm distance, a Manhattan distance, or a taxi distance.

It should be noted that the neural network may include a plurality of feature extraction layers (or referred to as addition filtering layers), and each feature extraction layer may include one or more feature extraction cores. To be specific, the neural network may include a plurality of feature extraction cores. Correspondingly, the plurality of feature extraction cores may be used to perform feature extraction processing on the input feature map for a plurality of times to obtain a plurality of output feature maps. In other words, each of the plurality of feature extraction cores may be used to perform feature extraction processing on the input feature map for one time, to correspondingly obtain one output feature map.

Figure 8:
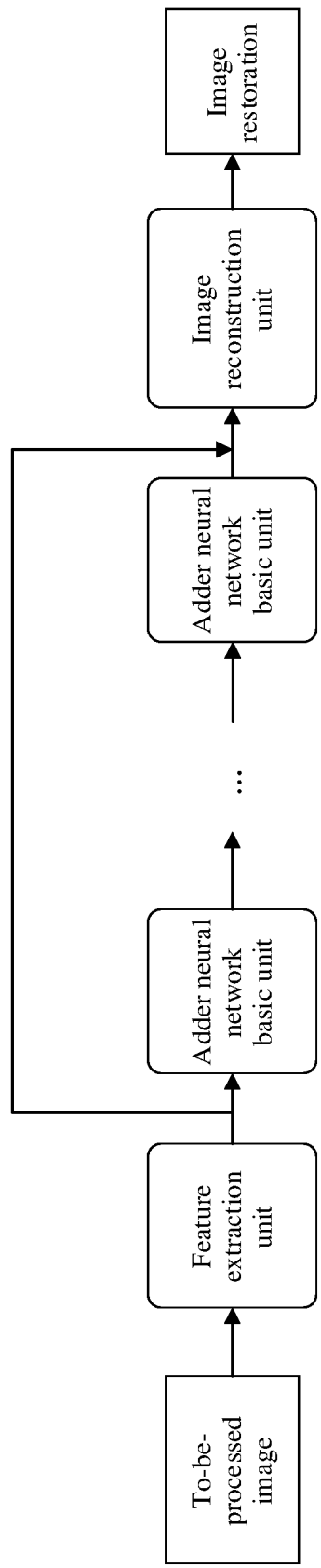
FIG. 8 is a schematic block diagram of a neural network model according to an embodiment of this disclosure.

For example, as shown in FIG. 8, a neural network 800 may include a feature extraction unit, a plurality of adder neural network basic units, and an image reconstruction unit. Each of the plurality of adder neural network basic units may include one or more feature extraction cores. The feature extraction layer of the neural network may be any adder neural network basic unit in the neural network 800 in FIG. 8.

Figure 9:
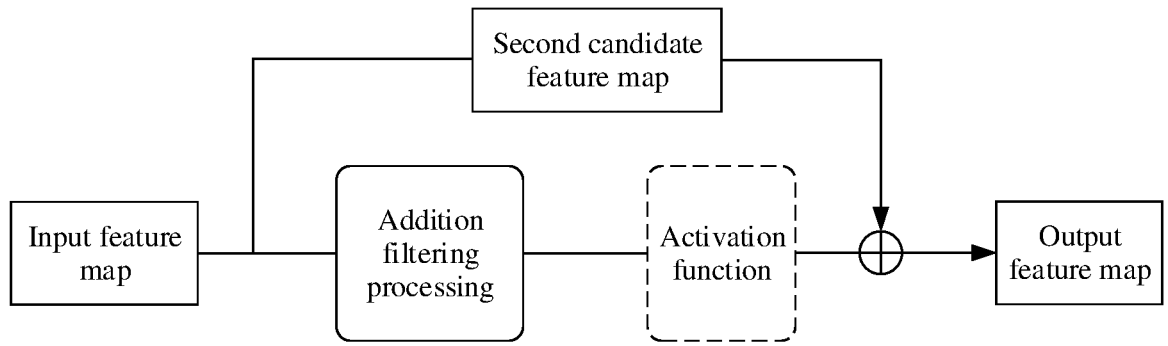
FIG. 9 is a schematic block diagram of a self-shortcut adder layer according to an embodiment of this disclosure.

One or more adder neural network basic units in the neural network 800 in FIG. 8 may be self-shortcut adder units shown in FIG. 9. As shown in FIG. 9, the self-shortcut adder unit may include an activation function.

Optionally, the activation function may be a non-linear activation function such as a sigmoid function, a tanh function, or a ReLU function; may be a power activation (learnable power activation) function mentioned in the following S530; or may be an activation function of another function (for example, an activation function that may enhance low-frequency texture information and the like in a feature map). This is not limited in this embodiment of this disclosure.

Alternatively, the self-shortcut adder unit shown in FIG. 9 may not include the activation function. This is not limited in this embodiment of this disclosure.

The feature extraction core in S520 may be one of a plurality of feature extraction cores included in the neural network. Correspondingly, the feature extraction processing in S520 may be one of a plurality of times of feature extraction.

For example, if the neural network includes 10 feature extraction cores, when image restoration is performed on the to-be-processed image, the 10 feature extraction cores may be used to separately perform feature extraction processing on the input feature map of the training image for 10 times. Correspondingly, 10 first candidate feature maps may be separately obtained.

Figure 6:
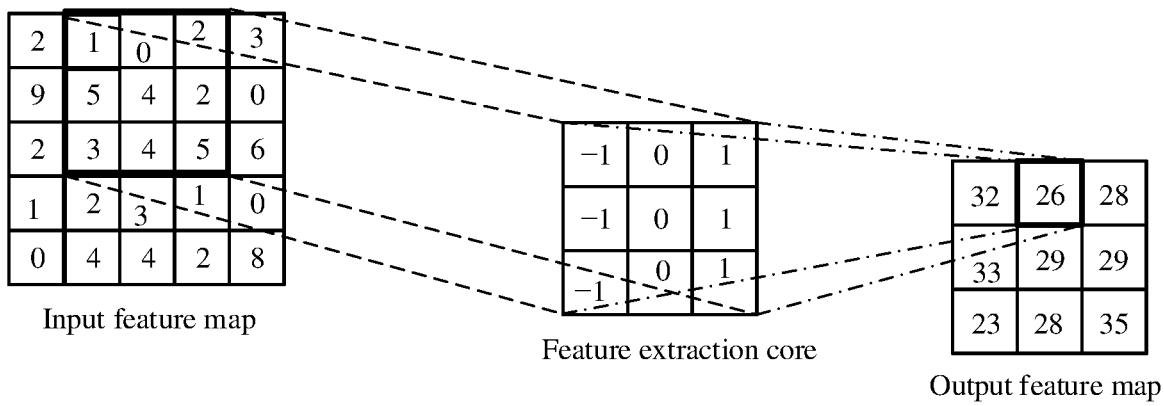
FIG. 6 is a schematic diagram of a feature extraction operation according to an embodiment of this disclosure.

The following describes in detail the feature extraction processing in S520 with reference to FIG. 6. The feature extraction processing may include one or more feature extraction operations.

For example, as shown in FIG. 6, a feature extraction core and a matrix including an element at a corresponding location in a sliding window (the sliding window herein is a black bold box in an input feature map, and a start location of the sliding window may be the top-left corner location of the input feature map) in the input feature map (for example, the input feature map of the training image) perform the feature extraction operation.

In this disclosure, the matrix including the corresponding element in the sliding window in the input feature map may also be referred to as an input feature submap. As the sliding window slides in a width direction or a height direction of the input feature map, a plurality of input feature submaps may be obtained. Therefore, it may also be understood that the input feature map includes the plurality of input feature submaps.

Optionally, the feature extraction operation in this embodiment of this disclosure may mean that a target matrix is obtained by subtracting an element at a corresponding location in the input feature submap from the feature extraction core, and absolute values of elements in the target matrix are obtained and then summed up.

In other words, the feature extraction operation in this embodiment of this disclosure may be considered as calculating an L1 regular distance between the feature extraction core and the input feature submap.

Alternatively, the feature extraction operation in this embodiment of this disclosure may mean that a target matrix is obtained by adding the feature extraction core and an element at a corresponding location in the input feature submap, and absolute values of elements in the target matrix are obtained and then summed up.

In other words, in this embodiment of this disclosure, the target matrix is obtained by performing matrix addition or matrix subtraction on the input feature submap and the feature extraction core corresponding to the target matrix.

A result of the feature extraction operation shown in FIG. 6 is 26. After the feature extraction operation shown in FIG. 6 is performed, the sliding window in the input feature map may slide in the width direction or the height direction of the input feature map to continue to perform a next convolution operation. A distance of each slide is 1 (that is, a sliding stride in both the width direction and the height direction is 1) until one time of feature extraction processing performed on the input image is completed, and a 3×3×1 output feature map shown in FIG. 6 is obtained.

It can be learned that the feature extraction processing shown in FIG. 6 may include the plurality of feature extraction operations, that is, the output feature map (for example, the first candidate feature map) shown in FIG. 6 may include results of the plurality of feature extraction operations.

It should be further understood that the foregoing description is provided by using an example in which the sliding stride of the feature extraction operation is 1. However, this embodiment of this disclosure is not limited thereto. The sliding stride of the feature extraction operation may alternatively be 2, or may be greater than 2.

It should be noted that the output feature map shown in FIG. 6 is merely an example rather than a limitation. All output feature submaps in the output feature map shown in FIG. 6 are obtained after matrix subtraction is performed on the output feature map and the feature extraction core.

Alternatively, one or more output feature submaps in the output feature map may be obtained after matrix addition is performed on the output feature map and the feature extraction core. This is not limited in this embodiment of this disclosure.

For example, if the neural network includes 10 feature extraction cores, when image processing is performed on the training image, the 10 feature extraction cores are used to separately perform feature extraction processing on the input feature map of the training image for 10 times.

If the input feature map of the training image is shown in FIG. 6, when the sliding stride of the feature extraction operation is 1, one time of feature extraction processing includes nine feature extraction operations. In this case, when image processing is performed on the training image, 90 feature extraction operations (10 times of feature extraction processing×9 feature extraction operations) need to be performed.

FIG. 7 shows a feature extraction operation in another embodiment of this disclosure. An input feature map (for example, the input feature map of the training image) in FIG. 7 is 5×5×3, both a height boundary and a width boundary filled in the input feature map are one pixel, and a 7×7×3 input feature map is obtained.

A size of a feature extraction core w0 in FIG. 7 is 3×3×3. Feature extraction is separately performed on three input feature maps (an input feature map 1, an input feature map 2, and an input feature map 3) of a to-be-processed image and three depths (a convolution kernel w0-1, a convolution kernel w0-2, and a convolution kernel w0-3) of the feature extraction core, to obtain an output feature map 1 (for example, the first candidate feature map). A size of the output feature map 1 is 3×3×1.

Specifically, the feature extraction operation is performed on a first depth (namely, w0-1) of w0 and a matrix including an element at a corresponding location in a sliding window (the sliding window herein is a black bold box in the input feature map 1, and a start location of the sliding window may be the top-left corner location of the input feature map) in the input feature map 1.

As shown in FIG. 7, a target matrix w0-1 is obtained by subtracting the matrix including the element at the corresponding location in the sliding window in the input feature map 1 from the feature extraction core w0-1, and absolute values of elements in the target matrix w0-1 are obtained and then summed up to obtain 9. Similarly, the feature extraction operation is separately performed on the other two depths (that is, w0-2 and w0-3) of the feature extraction core w0, and the input feature map 2 and the input feature map 3, to obtain a target matrix w0-2 and a target matrix w0-3. In this way, 10 and 10 are obtained. Therefore, a first element of the output feature map 1 in FIG. 1 is 9+10+10=29. After the first feature extraction operation of the feature extraction core w0 is performed, the sliding window sequentially slides in a width direction or a height direction of each input feature map to continue to perform a next feature extraction operation. A distance of each slide is 2 (that is, a sliding stride in both the width direction and the height direction is 2) until the feature extraction operation performed on the input image is complete, and the 3×3×1 output feature map 1 is obtained.

Similarly, if another feature extraction core w1 is further used to perform feature extraction on the input image in the feature extraction operation, the output feature map 2 may be obtained based on a process similar to a process of the feature extraction core w0. A size of the output feature map 2 is 3×3×2.

Optionally, the output feature map 1 and the output feature map 2 may be further activated by using an activation function to obtain an activated output feature map 1 and an activated output feature map 2.

Optionally, a matrix including corresponding elements in sliding windows in input feature maps (including the input feature map 1, the input feature map 2, and the input feature map 3) may also be referred to as an input feature submap. In FIG. 7, the input feature submap on which the feature extraction operation is performed is the matrix including the corresponding elements in the sliding windows in the three feature maps: the input feature map 1, the input feature map 2, and the input feature map 3, that is, a size of the input feature submap is 3×3×3.

Similarly, the target matrix in FIG. 7 is a matrix including the target matrix w0-1, the target matrix w0-2, and the target matrix w0-3, that is, a size of the target matrix is 3×3×3.

It should be further understood that the foregoing description is provided by using an example in which the sliding stride of the feature extraction operation is 1. However, this embodiment of this disclosure is not limited thereto. The sliding stride of the feature extraction operation may alternatively be 2, or may be greater than 2.

It should be noted that the output feature map shown in FIG. 7 is merely an example rather than a limitation.

For example, in this disclosure, at least one output feature submap Y (m,n,t) may be obtained by performing matrix addition on at least one input feature submap and the feature extraction core, and may be specifically shown in the following formula:

$$Y(m, n, t) = \sum_{i=0}^{d-1}\sum_{j=0}^{d-1}\sum_{k=1}^{C} |X(m+i, n+j, k) + F(i, j, k, t)|, \text{ or} \quad (1)$$

$$Y(m, n, t) = \sum_{i=0}^{d-1}\sum_{j=0}^{d-1}\sum_{k=1}^{C} -|X(m+i, n+j, k) + F(i, j, k, t)|. \quad (2)$$

For another example, at least one output feature submap Y(m,n,t) may be obtained by performing matrix subtraction on at least one input feature submap and the feature extraction core, and may be specifically shown in the following formula:

$$Y(m, n, t) = \sum_{i=0}^{d-1}\sum_{j=0}^{d-1}\sum_{k=1}^{C} |X(m+i, n+j, k) - F(i, j, k, t)|, \text{ or} \quad (3)$$

$$Y(m, n, t) = \sum_{i=0}^{d-1}\sum_{j=0}^{d-1}\sum_{k=1}^{C} -|X(m+i, n+j, k) - F(i, j, k, t)|. \quad (4)$$

$|(\cdot)|$ is an absolute value obtaining operation;

$\sum(\cdot)$ is a summation operation; Y(m,n,t) is the at least one output feature submap; Y(m,n,t) is an element in an $m^{th}$ row, an $n^{th}$ column, and a $t^{th}$ page in the output feature map; X(m+i,n+j,k) is an element in an $i^{th}$ row, a $j^{th}$ column, and a $k^{th}$ page in the at least one input feature submap; F (i,j,k,t) is an element in an $i^{th}$ row, a $j^{th}$ column, and a $k^{th}$ page of the feature extraction core; t is a quantity of channels of the feature extraction core;

d is a quantity of rows of the feature extraction core; C is a quantity of channels of the input feature map; and d, C, i, j, k, m, n, and t are all integers.

S530: Add the first candidate feature map and a second candidate feature map to obtain an output feature map.

The second candidate feature map may be a feature map obtained after a value corresponding to each element in the input feature map is increased by N times, and N is greater than 0.

It can be learned that S530 is equivalent to performing matrix addition on the first candidate feature map and the second candidate feature map.

For example, as shown in FIG. 9, the first candidate feature map is obtained after addition filtering processing (that is, the feature extraction processing in S520) is performed on the input feature map, and the output feature map is obtained after matrix addition is performed on the first candidate feature map and the second candidate feature map, where β indicates the matrix addition.

Particularly, when N is 1, the second candidate feature map is the input feature map (because the input feature map is still the same as the input feature map itself after being doubled). In this case, performing matrix addition on the first candidate feature map and the second candidate feature map is equivalent to performing matrix addition on the first candidate feature map and the input feature map, or may be understood as performing residual connection on the first candidate feature map and the input feature map.

Optionally, as shown in FIG. 9, adding the first candidate feature map and the second candidate feature map to obtain the output feature map may include:

processing the first candidate feature map by using an activation function to obtain the processed first candidate feature map; and adding the processed first candidate feature map and the second candidate feature map to obtain the output feature map.

Further, processing the first candidate feature map by using the activation function may include:

enhancing high-frequency texture information of the first candidate feature map by using a power activation (learnable power activation) function.

In this case, a parameter of the neural network may include a parameter of the power activation function.

For example, the power activation function may be $\mathcal{P}_{(Y)} = \text{sign}(Y) \cdot |Y|^\alpha$.

Y may be the first candidate feature map, sign(•) is a symbolic function, |•| is an absolute value operation, α may be a parameter of the power activation function, and α>0.

It should be understood that α is a parameter that can be learned.

S540: Determine an image processing result of the training image based on the output feature map.

The image processing includes at least one of image super-resolution processing, image denoising processing, image demosaicing processing, and image deblurring processing. Correspondingly, the image processing result may be a result obtained after at least one of image denoising, image demosaicing, image super-resolution, image deblurring, and another bottom-layer visual task. This is not limited in this embodiment of this disclosure.

Optionally, determining the image processing result of the training image based on the output feature map may include:

processing the output feature map by using an activation function to obtain the processed output feature map; and determining the image processing result of the training image by using the processed output feature map.

Further, processing the output feature map by using the activation function may include: enhancing high-frequency texture information of the output feature map by using a power activation function, where the parameter of the neural network includes a parameter of the power activation function.

In this case, a parameter of the neural network may include a parameter of the power activation function.

For example, the power activation function may be $\mathcal{P}_{(Y)} = \text{sign}(Y) \cdot |Y|^\alpha$.

Y may be the output feature map, sign(•) is a symbolic function, |•| is an absolute value operation, α may be a parameter of the power activation function, and α>0.

It should be understood that α is a parameter that can be learned.

It should be noted that the power activation function shown in S530 and S540 is merely an example rather than a limitation, and a specific form of the power activation function is not limited in this embodiment of this disclosure.

S550: Adjust a parameter of the neural network based on the image processing result.

It should be noted that the parameter of the neural network may include a parameter of the power activation function.

For example, when the high-frequency texture information of the first candidate feature map is enhanced by using the power activation function in S530, the parameter of the neural network may include the parameter of the power activation function in S530.

For another example, when the high-frequency texture information of the output feature map is enhanced by using the power activation function in S540, the parameter of the neural network may include the parameter of the power activation function in S540.

For another example, when the high-frequency texture information is enhanced by using the power activation function in S530 and S540, the parameter of the neural network may include the parameter of the power activation function in S530 and S540.

The following uses a common super-resolution task in the image restoration as an example to verify performance of a neural network obtained after training in the foregoing method 500.

Table 1 shows peak signal-to-noise ratios (PSNR) of each model on a plurality of datasets such as Set5, Set14, B100, and Urban100.

TABLE 1

Performance test results of image super-resolution for each model (scale × 2)

| Model | Model structure | | Set5 PSNR | Set14 PSNR | B100 PSNR | Urban 100 PSNR |
|---|---|---|---|---|---|---|
| | Self-shortcut adder unit | Power activation function | | | | |
| Adder neural network 1 | × | × | 35.11 | 31.40 | 30.63 | 27.77 |
| Adder neural network 2 | × | √ | 35.44 | 31.62 | 30.78 | 27.96 |
| Adder neural network 3 | √ | × | 37.10 | 32.77 | 31.69 | 30.05 |
| Adder neural network 4 | √ | √ | 37.37 | 32.91 | 31.82 | 30.48 |

TABLE 1-continued

Performance test results of image super-resolution for each model (scale × 2)

| Model | Model structure | | Set5 PSNR | Set14 PSNR | B100 PSNR | Urban 100 PSNR |
|---|---|---|---|---|---|---|
| | Self-shortcut adder unit | Power activation function | | | | |
| Convolutional neural network | — | — | 37.53 | 33.03 | 31.90 | 30.76 |

It can be learned from the test results in Table 1 that when an existing adder neural network (that is, the adder neural network 1, where the model does not include the self-shortcut adder unit or the power activation function) is directly applied to a super-resolution task, effect of the model is severely degraded (PSNR attenuation is greater than 2 dB).

After the self-shortcut adder unit and the power activation function provided in the this disclosure are used in the model, effect of the model (that is, the neural network obtained after training in the foregoing method 500) is greatly improved, and a PSNR is increased by more than 1.8 dB. Finally, a difference between effect of an adder neural network that includes both the self-shortcut adder unit or the power activation function and a PSNR of a standard multiplication convolutional network is reduced to less than 0.2 dB.

The following Table 2 shows experimental results that are for each model and that are of image super-resolution at different scales performed on the plurality of datasets such as Set5, Set14, B100, and Urban100.

TABLE 2

Performance test results of image super-resolution at different scales for each model

| Scale | Model | Type | Multiplication operation (G) | Addition operation (G) | Set5 PSNR/SSIM | Set14 PSNR/SSIM | B100 PSNR/SSIM | Urban 100 PSNR/SSIM |
|---|---|---|---|---|---|---|---|---|
| × 2 | VDSR | ANN | 1.1 | 1224.1 | 37.37/0.9575 | 32.91/0.9112 | 31.82/0.8947 | 30.48/0.9099 |
| | | CNN | 612.6 | 612.6 | 37.53/0.9587 | 33.03/0.9124 | 31.90/0.8960 | 30.76/0.9140 |
| | EDSR | ANN | 7.9 | 18489.8 | 37.92/0.9589 | 33.82/0.9183 | 32.23/0.9000 | 32.63/0.9309 |
| | | CNN | 9248.9 | 9248.9 | 38.11/0.9601 | 33.92/0.9195 | 32.32/0.9013 | 32.93/0.9351 |
| × 3 | VDSR | ANN | 1.1 | 1224.1 | 33.47/0.9151 | 29.62/0.8276 | 28.72/0.7953 | 26.95/0.8189 |
| | | CNN | 612.6 | 612.6 | 33.66/0.9213 | 29.77/0.8314 | 28.82/0.7976 | 27.14/0.8279 |
| | EDSR | ANN | 7.1 | 8825.2 | 34.35/0.9212 | 30.33/0.8420 | 29.13/0.8068 | 28.54/0.8555 |
| | | CNN | 4416.1 | 4416.1 | 34.65/0.9282 | 30.52/0.8462 | 29.25/0.8093 | 28.80/0.8653 |
| × 4 | VDSR | ANN | 1.1 | 1224.1 | 31.27/0.8762 | 27.93/0.7630 | 27.25/0.7229 | 25.09/0.7445 |
| | | CNN | 612.6 | 612.6 | 31.35/0.8838 | 28.01/0.7674 | 27.29/0.7251 | 25.18/0.7524 |
| | EDSR | ANN | 6.8 | 5442.6 | 32.13/0.8864 | 28.57/0.7800 | 27.58/0.7368 | 26.33/0.7874 |
| | | CNN | 2724.7 | 2724.7 | 32.46/0.8968 | 28.80/0.7876 | 27.71/0.7420 | 26.64/0.8033 |

It can be learned from the test results in Table 2 that the neural network obtained after training by using the foregoing method 500 can basically achieve super-resolution effect of a standard multiplication convolutional neural network (an average difference is within 0.2 dB).

The following Table 3 shows performance test results of image denoising and image demosaicing for each model.

TABLE 3

Performance test results of image denoising and image demosaicing for each model

| Model | Standard multiplication convolutional neural network | Adder neural network obtained after training by using the method in this disclosure |
|---|---|---|
| PSNR | 36.58 | 36.35 |

It can be learned from the test results in Table 3 that the neural network obtained after training by using the foregoing method 500 can basically achieve effect of the standard multiplication convolutional neural network (a difference is 0.23 dB).

In addition, in this embodiment of this disclosure, an example in which a size of an output image is 1280×720 is further used to calculate energy consumption of the neural network obtained after training by using the method in embodiments of this disclosure. The CNN is the standard multiplication convolutional neural network, and the ANN is the neural network obtained after training by using the method in embodiments of this disclosure.

TABLE 4

Energy consumption (scale x 2) of the neural network obtained after training by using the method in embodiments of this disclosure

| Model | VDSR | | EDSR | |
|---|---|---|---|---|
| | CNN | ANN | CNN | ANN |
| Power consumption | 2266.6G | 1105.6G | 34220.8G | 16670.3G |

It can be learned from the test results in Table 4 that the neural network obtained after training by using the method in embodiments of this disclosure can effectively reduce 60% energy consumption of the model while maintaining model precision. If 8-bit quantization is further performed on the neural network, energy consumption can be further reduced by 3.8 times.

In conclusion, the neural network obtained after training by using the method in embodiments of this disclosure can basically achieve same effect as the standard convolutional neural network. In addition, the energy consumption of the model can be greatly reduced.

Figure 10:
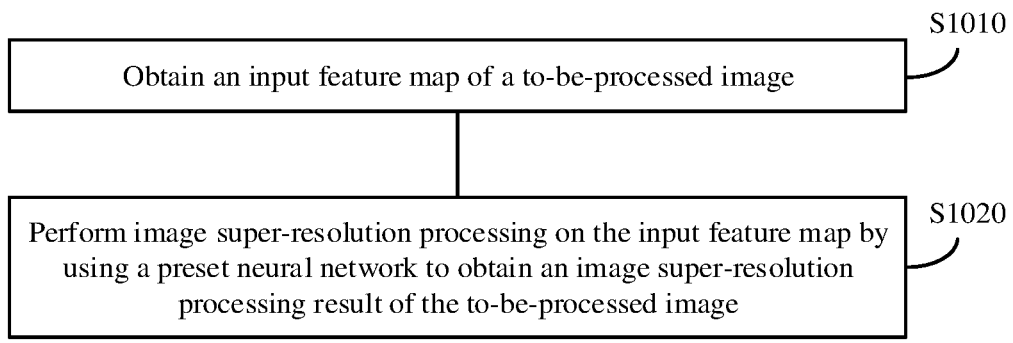
FIG. 10 is a schematic flowchart of an image processing method according to an embodiment of this disclosure.

FIG. 10 is a schematic flowchart of an image processing method according to this disclosure. The method 1000 in FIG. 10 includes step 1010 and step 1020.

In some examples, the method 1000 may be performed by devices such as the execution device 110 in FIG. 1, the chip shown in FIG. 3, and the execution device 210 in FIG. 4.

S1010: Obtain an input feature map of a to-be-processed image.

S1020: Perform image processing on the input feature map by using a preset neural network to obtain an image processing result of the to-be-processed image.

The neural network may be determined by using a neural network predictor, and the neural network predictor is obtained after training by using the method 500 in FIG. 5.

For example, a structure of the neural network may be shown as the neural network 800 in FIG. 8.

Specifically, the neural network may be similar to the neural network 800 in FIG. 8, and includes one or more adder neural network basic units, which may be self-shortcut adder units shown in FIG. 9. As shown in FIG. 9, the self-shortcut adder unit may include the activation function. For specific description, refer to the embodiment in the foregoing method 500. Details are not described herein again.

Figure 11:
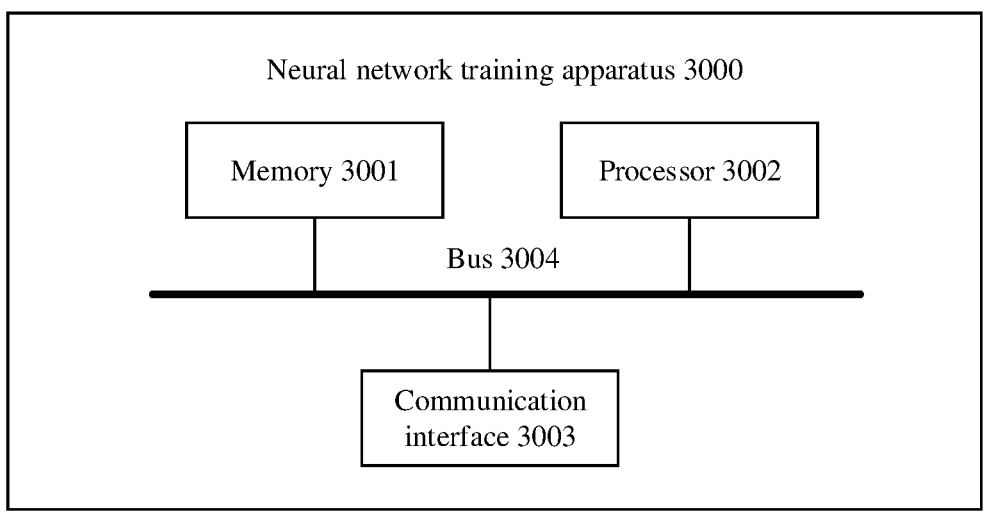
FIG. 11 is a schematic block diagram of a neural network training apparatus according to an embodiment of this disclosure.

FIG. 11 is a schematic diagram of a hardware structure of a neural network training apparatus according to an embodiment of this disclosure. The neural network training apparatus 3000 shown in FIG. 11 (the apparatus 3000 may specifically be a computer device) includes a memory 3001, a processor 3002, a communication interface 3003, and a bus 3004. The memory 3001, the processor 3002, and the communication interface 3003 are communicatively connected to each other through the bus 3004.

The memory 3001 may be a read-only memory (ROM), a static storage device, a dynamic storage device, or a random access memory (RAM). The memory 3001 may store a program. When executing the program stored in the memory 3001, the processor 3002 is configured to perform steps of the neural network training method in embodiments of this disclosure.

The processor 3002 may be a general-purpose central processing unit (CPU), a microprocessor, an application-specific integrated circuit (ASIC), a graphics processing unit (GPU), or one or more integrated circuits, and is configured to execute a related program, to implement the neural network training method in the method embodiments of this disclosure.

Alternatively, the processor 3002 may be an integrated circuit chip and has a signal processing capability. For example, the processor 3002 may be the chip shown in FIG. 2. In an implementation process, the steps of the neural network training method in this disclosure may be completed by using a hardware integrated logic circuit in the processor 3002 or instructions in a form of software.

The processor 3002 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in embodiments of this disclosure.

The general-purpose processor may be a microprocessor, or the processor may be any conventional processor or the like. Steps of the methods disclosed with reference to embodiments of this disclosure may be directly performed by a hardware decoding processor, or may be performed by using a combination of hardware and software modules in the decoding processor. The software module may be located in a mature storage medium in the art, for example, a random access memory, a flash memory, a read-only memory, a programmable read-only memory, an electrically erasable programmable memory, a register, or the like. The storage medium is located in the memory 3001. The processor 3002 reads information in the memory 3001, and completes, in combination with hardware of the processor 3002, a function that needs to be performed by a unit included in the neural network training apparatus, or performs the neural network training method in the method embodiments of this disclosure.

The communication interface 3003 uses a transceiver apparatus, for example but not limited to, a transceiver, to implement communication between the apparatus 3000 and another device or a communication network. For example, information about a to-be-constructed neural network predictor and training data required in a neural network training process may be obtained through the communication interface 3003.

The bus 3004 may include a path for transmitting information between the components (for example, the memory 3001, the processor 3002, and the communication interface 3003) of the apparatus 3000.

Figure 12:
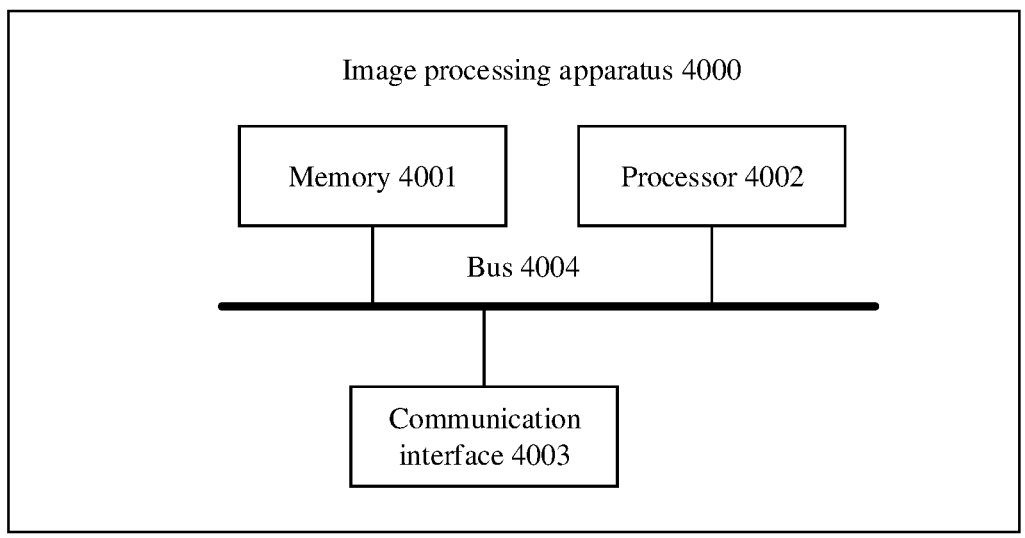
FIG. 12 is a schematic block diagram of an image processing apparatus according to an embodiment of this disclosure.

FIG. 12 is a schematic diagram of a hardware structure of an image processing apparatus according to an embodiment of this disclosure. The image processing apparatus 4000 shown in FIG. 12 includes a memory 4001, a processor 4002, a communication interface 4003, and a bus 4004. The memory 4001, the processor 4002, and the communication interface 4003 are communicatively connected to each other through the bus 4004.

The memory 4001 may be a ROM, a static storage device, or a RAM. The memory 4001 may store a program. When the program stored in the memory 4001 is executed by the processor 4002, the processor 4002 and the communication interface 4003 are configured to perform the steps of the image processing method in embodiments of this disclosure.

The processor 4002 may be a general-purpose CPU, a microprocessor, an ASIC, a GPU, or one or more integrated circuits, and is configured to execute a related program, to implement a function that needs to be executed by a unit in the image processing apparatus in this embodiment of this disclosure, or perform the image processing method in the method embodiments of this disclosure.

Alternatively, the processor 4002 may be an integrated circuit chip and has a signal processing capability. For example, the processor 4002 may be the chip shown in FIG. 2. In an implementation process, the steps of the image processing method in embodiments of this disclosure may be completed by using a hardware integrated logic circuit in the processor 4002 or instructions in a form of software.

The foregoing processor 4002 may alternatively be a general-purpose processor, a DSP, an ASIC, an FPGA or another programmable logic device, a discrete gate or transistor logic device, or a discrete hardware component. The processor may implement or perform the methods, the steps, and the logical block diagrams that are disclosed in embodiments of this disclosure. The general-purpose processor may be a microprocessor, or the processor may be any conventional processor or the like. Steps of the methods disclosed with reference to embodiments of this disclosure may be directly performed by a hardware decoding processor, or may be performed by using a combination of hardware and software modules in the decoding processor. The software module may be located in a mature storage medium in the art, for example, a random access memory, a flash memory, a read-only memory, a programmable read-only memory, an electrically erasable programmable memory, a register, or the like. The storage medium is located in the memory 4001. The processor 4002 reads information in the memory 4001, and completes, in combination with hardware of the processor 4002, a function that needs to be executed by a unit included in the image processing apparatus in this embodiment of this disclosure, or performs the image processing method in the method embodiments of this disclosure.

The communication interface 4003 uses a transceiver apparatus, for example but not limited to, a transceiver, to implement communication between the apparatus 4000 and another device or a communication network. For example, a to-be-processed image may be obtained through the communication interface 4003.

The bus 4004 may include a path for transmitting information between the components (for example, the memory 4001, the processor 4002, and the communication interface 4003) of the apparatus 4000.

It should be understood that, the processor in embodiments of this disclosure may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this disclosure may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) that is used as an external cache. By way of example but not limitation, random access memories (RAM) in a plurality of forms may be used, for example, a static random access memory (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM), and a direct rambus RAM y (DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedures or functions according to embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state disk.

It should be understood that the term "and/or" in this specification describes only an association relationship between associated objects, and indicates that three relationships may exist. For example, A and/or B may indicate the following three cases: Only A exists, both A and B exist, and only B exists, where A and B may be singular or plural. In addition, the character "/" in this specification usually indicates an "or" relationship between associated objects, or may indicate an "and/or" relationship. A specific meaning depends on the context.

In this disclosure, "at least one" means one or more, and "a plurality of" means two or more. "At least one of the following items (pieces)" or a similar expression thereof refers to any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium, for example, a USB flash drive, a removable hard disk, a read-only memory (ROM), a random access memory (RAM), a magnetic disk, an optical disc, or the like that can store program code.

The foregoing description is merely a specific implementation of this disclosure, but is not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A neural network training method comprising:
    obtaining an input feature map of a training image;
    performing feature extraction processing on the input feature map by using a feature extraction core of a neural network to obtain a first intermediate feature map, wherein the feature extraction processing enables each element in the first intermediate feature map to be an L1 regular distance between the feature extraction core and data at a corresponding location in the input feature map;
    adding the first intermediate feature map and a second intermediate feature map to obtain an output feature map, wherein the second intermediate feature map is a feature map obtained after a value corresponding to each element in the input feature map is increased by N times, and N is an integer that is greater than 0;
    determining an image processing result of the training image based on the output feature map; and
    adjusting a parameter of the neural network based on the image processing result;
    wherein the adding of the first intermediate feature map and the second intermediate feature map to obtain the output feature map comprises:
        processing the first intermediate feature map by using an activation function to obtain a processed first intermediate feature map; and
        adding the processed first intermediate feature map and the second intermediate feature map to obtain the output feature map, and
    wherein the processing of the first intermediate feature map by using the activation function comprises:
        enhancing high-frequency texture information of the first intermediate feature map by using a power activation function, wherein the parameter of the neural network comprises a parameter of the power activation function.

2. The method according to claim 1, wherein the determining of the image processing result of the training image based on the output feature map comprises:
    processing the output feature map by using another activation function to obtain a processed output feature map; and
    determining the image processing result of the training image by using the processed output feature map.

3. The method according to claim 2, wherein the processing of the output feature map by using the another activation function comprises:
    enhancing high-frequency texture information of the output feature map by using another power activation function, wherein the parameter of the neural network comprises a parameter of the another power activation function.

4. The method according to claim 1, wherein the power activation function is $\mathcal{P}(Y) = \text{sign}(Y) \cdot |Y|^\alpha$, wherein Y is a feature map input into the power activation function, $\text{sign}(\bullet)$ is a symbolic function, $|\bullet|$ is an absolute value operation, $\alpha$ is a parameter of the power activation function, and $\alpha > 0$.

5. An image processing method comprising:
    obtaining an input feature map of a training image;
    performing feature extraction processing on the input feature map by using a feature extraction core of a neural network to obtain a first intermediate feature map, wherein the feature extraction processing enables each element in the first intermediate feature map to be an L1 regular distance between the feature extraction core and data at a corresponding location in the input feature map;
    adding the first intermediate feature map and a second intermediate feature map to obtain an output feature map, wherein the second intermediate feature map is a feature map obtained after a value corresponding to each element in the input feature map is increased by N times, and N is an integer that is greater than 0;
    determining an image processing result of the training image based on the output feature map;
    adjusting a parameter of the neural network based on the image processing result to obtain a trained neural network;
    obtaining an input feature map of a to-be-processed image; and
    performing image processing on the input feature map of the to-be-processed image by using the trained neural network to obtain an image processing result of the to-be-processed image;
    wherein the adding of the first intermediate feature map a and the second intermediate feature map to obtain the output feature map comprises:
        processing the first intermediate feature map by using an activation function to obtain a processed first intermediate feature map, and adding the processed first intermediate feature map and the second intermediate feature map to obtain the output feature map; and serein the processing of the first intermediate feature map by using the activation function comprises:

enhancing high-frequency texture information of the first intermediate feature map by using a power activation function, wherein the parameter of the neural network comprises a parameter of the power activation function.

6. The method according to claim 5, wherein the image processing comprises at least one of image super-resolution processing, image denoising processing, image demosaicing processing, or image deblurring processing.

7. The method according to claim 5, wherein the determining of the image processing result of the training image based on the output feature map comprises:

processing the output feature map by using another activation function to obtain a processed output feature map; and determining the image processing result of the training image by using the processed output feature map.

8. The method according to claim 7, wherein the processing of the output feature map by using the another activation function comprises:

enhancing high-frequency texture information of the output feature map by using another power activation function, wherein the parameter of the neural network comprises a parameter of the another power activation function.

9. The method according to claim 5, wherein the power activation function is $\mathcal{P}(Y)=\text{sign}(Y)\cdot|Y|^{\alpha}$, wherein Y is a feature map input into the power activation function, sign(•) is a symbolic function, |•| is an absolute value operation, α is a parameter of the power activation function, and α>0.

10. A neural network training apparatus comprising:

a processor and a non-transitory computer-readable memory storing instructions which upon execution by the processor cause the neural network training apparatus to at least be configured to:

obtain an input feature map of a training image;

perform feature extraction processing on the input feature map by using a feature extraction core of a neural network to obtain a first intermediate feature map, wherein the feature extraction processing enables each element in the first intermediate feature map to be an L1 regular distance between the feature extraction core and data at a corresponding location in the input feature map;

perform processing including adding the first intermediate feature map and a second intermediate feature map to obtain an output feature map, wherein the second intermediate feature map is a feature map obtained after a value corresponding to each element in the input feature map is increased by N times, and N is an integer that is greater than 0;

perform image processing including determining an image processing result of the training image based on the output feature map; and adjust a parameter of the neural network based on the image processing result, wherein in order to perform the processing, the neural network training apparatus is further configured to:

process the first intermediate feature map by using an activation function to obtain a processed first intermediate feature map; and add the processed first intermediate feature map and the second intermediate feature map to obtain the output feature map; and wherein in order to perform the processing, the neutral network training apparatus is further configured to:

enhance high-frequency texture information of the first intermediate feature man by using a power activation function, wherein the parameter of the neural network comprises a para meter of the power activation function.

11. The apparatus according to claim 10, wherein in order to perform the image processing, the neural network training apparatus is further configured to:

process the output feature map by using another activation function to obtain a processed output feature map; and determine the image processing result of the training image by using the processed output feature map.

12. The apparatus according to claim 11, wherein in order to perform the image processing, the neural network training apparatus is further configured to:

enhance high-frequency texture information of the output feature map by using another power activation function, wherein the parameter of the neural network comprises a parameter of the another power activation function.

13. The apparatus according to claim 10, wherein the power activation function is $\mathcal{P}(Y)=\text{sign}(Y)\cdot|Y|^{\alpha}$, wherein Y is a feature map input into the power activation function, sign(•) is a symbolic function, |•| is an absolute value operation, α is a parameter of the power activation function, and α>0.

14. The method according to claim 1, wherein the parameter of the power activation function is learnable such that the power activation function is a learnable power activation function trained to help the neural network adapt to different tasks and/or scenarios.

* * * * *